(12) United States Patent
Wertz et al.

(10) Patent No.: US 8,798,207 B2
(45) Date of Patent: Aug. 5, 2014

(54) SYNCHRONIZING RECEIVERS IN A SIGNAL ACQUISITION SYSTEM

(75) Inventors: Daniel S. Wertz, Sebastopol, CA (US);
Andrew J. Hinde, Austin, TX (US);
Johnathan R. W. Ammerman,
Spokane, WA (US)

(73) Assignee: National Instruments Corporation, Austin, TX (US)

( * ) Notice: Subject to any disclaimer, the term of this patent is extended or adjusted under 35 U.S.C. 154(b) by 254 days.

(21) Appl. No.: 13/528,081

(22) Filed: Jun. 20, 2012

(65) Prior Publication Data

US 2013/0343490 A1 Dec. 26, 2013

(51) Int. Cl.
*H04L 7/04* (2006.01)
(52) U.S. Cl.
USPC .......................................... 375/340; 375/356
(58) Field of Classification Search
CPC .................................................. H04W 56/0035
USPC ........................................................ 375/340
See application file for complete search history.

(56) References Cited

U.S. PATENT DOCUMENTS

| | | | | |
|---|---|---|---|---|
| 6,091,362 | A * | 7/2000 | Stilp et al. | 342/465 |
| 6,334,059 | B1 * | 12/2001 | Stilp et al. | 455/404.2 |
| 6,434,583 | B1 * | 8/2002 | Dapper et al. | 708/409 |
| 7,240,231 | B2 | 7/2007 | Conway | |
| 7,310,522 | B2 * | 12/2007 | Geile | 455/424 |
| 7,315,791 | B2 | 1/2008 | Ilic et al. | |
| 7,535,822 | B2 * | 5/2009 | Geile et al. | 370/208 |
| 7,624,294 | B2 | 11/2009 | Conway | |
| 2002/0172223 | A1 * | 11/2002 | Stilp | 370/480 |
| 2002/0186167 | A1 * | 12/2002 | Anderson | 342/465 |
| 2007/0207760 | A1 * | 9/2007 | Kavadias et al. | 455/255 |

OTHER PUBLICATIONS

National Instruments, "Fundamentals of Phase-Coherent RF Measurement Systems," created by Ande Hinde, Nov. 21, 2011, 37 pages.
National Instruments, "Using NI-TClk to Synchronize Signal Generators," http://www.ni.com/white-paper/5501/en, Jun. 14, 2011, 6 pages.
National Instruments, "Configuring Phase-Coherent RF Measurement Systems: From MIMO to Beamforming," http://www.ni.com/white-paper/9127/en, May 13, 2011, 4 pages.

(Continued)

*Primary Examiner* — Michael Neff
(74) *Attorney, Agent, or Firm* — Meyertons Hood Kivlin Koweer & Goetzel, P.C.; Jeffrey C. Hood; Mark K. Brightwell

(57) ABSTRACT

A system and method for synchronizing a plurality of receivers. A tone from a signal generator is swept over a frequency band. A power splitter splits the tone into a plurality of resultant tones that are supplied to the respective receivers. For each receiver, a relative frequency response (including amplitude and phase responses) is measured between the receiver and a master receiver. A linear approximation to the phase response is computed. A digital filter is custom designed for the receiver to compensate for non-uniformity of the amplitude response and for deviations of the phase from the linear approximation. After applying the digital filter, further adjustments are made to remove the time delay corresponding to the linear approximation, e.g., by appropriately configuring a fractional resampler, by adjusting a numerically-controlled oscillator, and/or, by adjusting sample clock phase.

26 Claims, 17 Drawing Sheets

(56) References Cited

OTHER PUBLICATIONS

National Instruments, "National Instruments T-Clock Technology for Timing and Synchronization of Modular Instruments," http://www.ni.com/white-paper/3675/en (retrieved Nov. 27, 2012), Jul. 19, 2011, 10 pages.

National Instruments, "NI-TC1k Overview," http://zone.ni.com/reference/en-XX/help/370592E-01/nitclk/nitclk_overview/ (retrieved Nov. 27, 2012), 2009, 2 pages.

* cited by examiner calibrate a plurality of receiver channels, where the action of calibrating the receiver channels includes performing a set of operations for each of the slave channels, where the set of operations includes the following operations
*610* compute a relative frequency response between a slave channel and the master channel, where the relative frequency response is based on the baseband sample sequence of the slave channel and the baseband sample sequence of the master channel
*615* compute a digital filter for the slave channel based on the relative frequency response, where the digital filter is configured to compensate for non-uniformity in amplitude of the relative frequency response and for a deviation of phase of the relative frequency response from a linear approximation to the phase of the relative frequency response
*620* program a digital circuit of the slave channel to implement the digital filter, where, after the operation of programming, the digital circuit of the slave channel applies the digital filter to the respective IF sample sequence prior to said digital down-converting of the respective IF sample sequence
*625*

*600*

FIG. 6 calibrate a second receiver, where the action of calibrating the second
receiver synchronizes the second receiver to a first receiver, where the
action of calibrating includes performing the following operations
710 computing a relative frequency response of the second
receiver with respect to the first receiver based on the
baseband sample sequence of the second receiver and
the baseband sample sequence of the first receiver
715 computing a digital filter for the second receiver based on the
relative frequency response, where the digital filter is configured
to compensate for non-uniformity in amplitude of the relative
frequency response and for a deviation of phase of the relative
frequency response from a linear approximation of the phase of
the relative frequency response
720 programming a digital circuit of the second receiver to
implement the digital filter, where, after this programming
operation, the digital circuit applies the digital filter to the
IF sample sequence of the second receiver prior to the
digital down-converting of the IF sample sequence
725

Phase Coherent Cal Data Array

| Center Frequency (Hz) | Center Frequency (Hz) | Center Frequency (Hz) |
|---|---|---|
| 1.000G | 1.000G | 1.000G |
| Reference Level (dBm) | Reference Level (dBm) | Reference Level (dBm) |
| -10.00 | -10.00 | -10.00 |
| Preamp Enabled | Preamp Enabled | Preamp Enabled |
| Disabled | Disabled | Disabled |
| Impulse Response | Impulse Response | Impulse Response |
| 0   -1.38166E- | 0   -0.0002728 | 0   -0.0003554 |
| Sample Clk Delay (sec) | Sample Clk Delay (sec) | Sample Clk Delay (sec) |
| 0.000 | 1.206n | -12.940p |
| Phase DAC Code | Phase DAC Code | Phase DAC Code |
| 2048 | 2671 | 2016 |
| Phase Offset (deg) | Phase Offset (deg) | Phase Offset (deg) |
| 0.00 | -123.27 | -48.51 |
| DC Temp (*C) | DC Temp (*C) | DC Temp (*C) |
| 45.48 | 45.64 | 45.44 |
| Digitizer Temp (*C) | Digitizer Temp (*C) | Digitizer Temp (*C) |
| 45.50 | 44.75 | 45.75 |
| LO Temp (*C) | LO Temp (*C) | LO Temp (*C) |
| 42.22 | 42.22 | 42.22 |

*FIG. 12*

SYNCHRONIZING RECEIVERS IN A SIGNAL ACQUISITION SYSTEM

FIELD OF THE INVENTION

The present invention relates to the field of signal processing, and more particularly to systems and methods for synchronizing a plurality of receivers.

DESCRIPTION OF THE RELATED ART

A plurality of receivers may be configured to form a phase-coherent RF acquisition system. For example, the 5663 and 5665 series of vector signal analyzers (VSAs) provided by National Instruments enable the sharing of local oscillator (LO) signal(s) and reference clocks between each VSA channel in a multi-channel system. However, some applications require a high degree of synchronization between the plurality of receivers, e.g., a higher degree of synchronization than can be achieved by existing tools.

SUMMARY

A computer-implemented method for synchronizing a set of receiver channels may include the following actions.

The method may involve calibrating the plurality of receiver channels in order to synchronize the plurality of receiver channels. In the calibration process, one of the receiver channels is designated as a master channel, and the one or more remaining receiver channels are designated as slave channels. Each of the receiver channels (master or slave) includes a signal path that is configured to: (a) down-convert a respective input signal to obtain a respective intermediate frequency (IF) signal, (b) digitize the respective IF signal based on a respective sample clock to obtain a respective IF sample sequence, and (c) digitally down-convert the respective IF sample sequence to obtain a respective baseband sample sequence.

The action of calibrating the receiver channels includes performing a set of operations for each of the slave channels. The set of operations may include computing a relative frequency response between the slave channel and the master channel, where the relative frequency response is based on the baseband sample sequence of the slave channel and the baseband sample sequence of the master channel. The set of operations may also include computing a digital filter for the slave channel based on the relative frequency response, where the digital filter is configured to compensate for non-uniformity in amplitude of the relative frequency response and for a deviation of phase of the relative frequency response from a linear approximation of the phase of the relative frequency response. The set of operations may also include programming a digital circuit of the slave channel to implement the digital filter. After the action of programming the digital circuit of the slave channel, the digital circuit applies the digital filter to the respective IF sample sequence prior to the action of digitally down-converting the respective IF sample sequence.

In some embodiments, the action calibrating the receiver channels also includes performing an initial synchronization process (e.g., executing an initial synchronization program) that causes the sample clocks of the respective receiver channels to be more closely aligned in time than prior to the initial synchronization process. The action of computing a relative frequency response for each of the slave channels is performed after having performed the initial synchronization process.

In some embodiments, the set of operations (which is performed for each of the slave channels) also includes: (1) computing an updated relative phase response between the slave channel and the master channel after having performed said programming; (2) computing a slope of the updated relative phase response; and (3) directing the slave channel to apply a time delay to its signal path, wherein the value of the time delay is based on the computed slope.

In some embodiments, the action of directing the slave channel to apply the time delay includes adjusting a phase of the sample clock of the slave channel based on the computed slope. In other embodiments, that action includes programming the digital circuit of the slave channel to implement a modified digital filter that incorporates the time delay. In yet other embodiments, that action includes programming the digital circuit to implement the fractional resampler in addition to the digital filter.

In some embodiments, the set of operations (which is performed for each of the slave channels) also includes: computing a second updated relative phase response between the slave channel and the master channel after having performed said directing the slave channel to apply the time delay to its signal path; computing a residual slope of the second updated relative phase response; and adjusting a phase of the sample clock of the slave channel based on the computed residual slope.

In some embodiments, each of the receiver channels includes a corresponding numerically controlled oscillator (NCO) configured to generate an orthogonal pair of digital sinusoids having programmable phase and programmable frequency. In these embodiments, set of operations may also include: computing a third updated relative phase response between the slave channel and the master channel after said adjusting the phase of the sample clock of the slave channel; computing an average phase value of the corresponding third updated relative phase response; and adjusting the phase of the corresponding numerically controlled oscillator in order to remove the corresponding average phase value.

BRIEF DESCRIPTION OF THE DRAWINGS

A better understanding of the present inventions can be obtained when the following detailed description is considered in conjunction with the following drawings.

FIG. 6 illustrates one embodiment of a method for synchronizing a plurality of receiver channels in an acquisition system.

FIG. 7 illustrates another embodiment of a method for synchronizing a second receiver to a first receiver in an acquisition system.

FIG. 12 shows calibration data for the master channel (first column) and the two slave channels (last two column).

Figure 1:
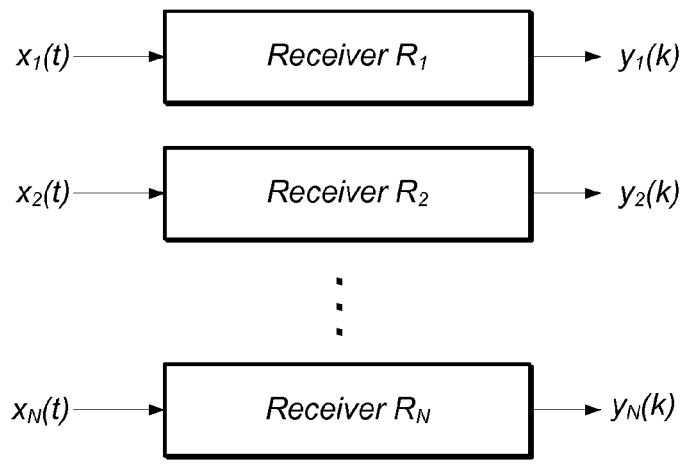
FIG. 1 illustrates one embodiment of an acquisition system including a plurality of receivers.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note that the various section headings in the following Detailed Description are for organizational purposes only and are not meant to be used to limit the claims.

DETAILED DESCRIPTION

Terminology

The following is a glossary of terms used in the present application:

Memory Medium—

Any of various types of memory devices or storage devices. The term "memory medium" is intended to include an installation medium, e.g., a CD-ROM, floppy disks 105, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Programmable Hardware Element— includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System— any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as application specific integrated circuits (ASICs). In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a tablet computer, a wearable computer, etc.

In one set of embodiments, a system may include a plurality of receivers $R_1, R_2, \ldots, R_N$ as shown in FIG. 1. N is an integer greater than or equal to two. Each receiver $R_i$, i=1, 2, ..., N, receives a corresponding input signal $x_i(t)$ and generates a corresponding baseband signal $y_i(k)$, where t is time, where k is a discrete time index. The input signals $\{x_i(t)\}$ may be RF signals. After the system has been calibrated by the methodology described herein, the receivers may receive the input signals $\{x_i(t)\}$, e.g., from respective antennas. However, during the calibration, the input signals $\{x_i(t)\}$ may be received from a power splitter as described below.

Figure 2:
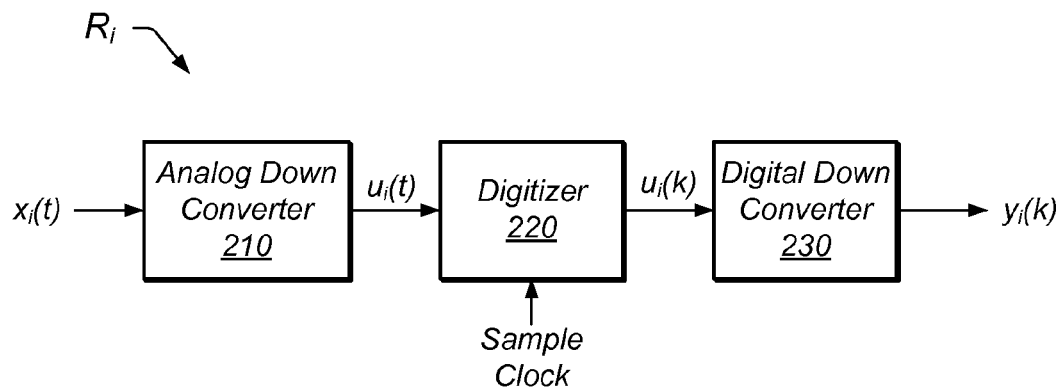
FIG. 2 illustrates one embodiment of a generic one of the receivers of FIG. 1.

In some embodiments, each receiver $R_i$ includes an analog downconverter 210, a digitizer 220 and a digital downconverter 23, e.g., as shown in FIG. 2. The analog downconverter 210 downconverts the input signal $x_i(t)$ to obtain an intermediate frequency (IF) signal $u_i(t)$. The digitizer digitizes the IF signal $u_i(t)$ to obtain an IF sample sequence $u_i(k)$, where k is the sequence index. The digital downconverter 230 downconverts the IF sample sequence $u_i(k)$ to obtain the baseband sample sequence $y_i(k)$.

In some embodiments, each receiver $R_i$ also includes a digital circuit 225 configured to operate on (e.g., to filter) the IF sample sequence $u_i(k)$ to obtain a modified sample sequence $v_i(k)$. The modified sample sequence $v_i(k)$ is then downconverted by the digital downconverter 230 to obtain the baseband sample sequence $y_i(k)$. The functionality of the digital circuit is programmable. In various embodiments, the digital circuit is realized by one or more programmable hardware elements, by a processor operating under the control of program instructions, by dedicated digital circuitry such as one or more ASICs, or any combination of the foregoing.

In some embodiments, the receivers $R_1, R_2, \ldots, R_N$ are vector signal analyzers (VSAs), e.g., the PXIe-5665 (or PXIe-5563) VSAs provided by National Instruments. In some embodiments, the vector signal analyzers are test instruments. Test instruments are generally used to perform the testing of devices under test (DUTs) or systems under test (SUTs). Test instruments generally include one or more inputs and outputs for connecting to SUTs. The inputs and outputs may be analog, digital, radio frequency, etc., e.g., at various voltage levels and frequencies. Test instruments are generally able to perform one or more tests or features. For example, test instruments may be configured to capture and analyze waveforms, calculate measured power, generate a tone at a programmed frequency, etc. Test instruments are also typically calibrated in order to achieve a specified level of accuracy on its I/O. Finally, test instruments usually include a user interface in order to specify how the test instrument should behave.

In some embodiments, the receivers $R_1, R_2, \ldots, R_N$ form a phase-coherent RF acquisition system. When applied to instrumentation, the term "phase coherent" implies that the receivers share a common LO signal for downconversion.

In some embodiments, it is desired that all the receivers be synchronized, i.e., have the same frequency response over a designated frequency band. In other words, it is desired that the frequency responses of the N receivers be identical. The present patent discloses how this synchronization may be achieved (or at least approximated).

Figure 4:
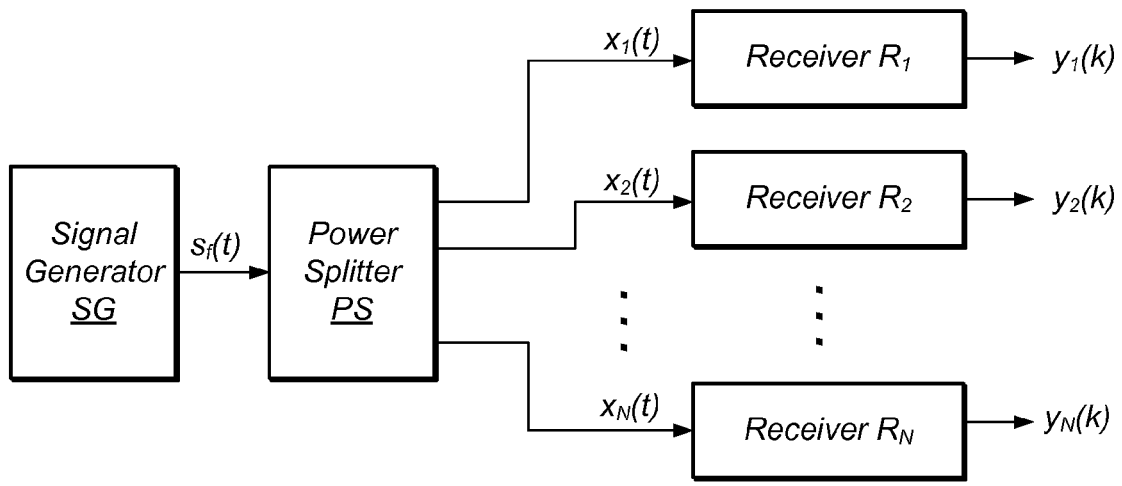
FIG. 4 illustrates one embodiment of a hardware configuration for calibrating the acquisition system.

During a calibration mode, a signal generator SG and a power splitter PS may be configured as shown in FIG. 4 to provide the input signals $x_1(t), x_2(t), \ldots, x_N(t)$ respectively to the receivers $R_1, R_2, \ldots, R_N$. The signal generator SG generates a tone $s_f(t)$ at frequency f equal to $f_0 + \Delta f$, where $f_0$ is an RF center frequency, where $\Delta f$ is a frequency displacement relative to the center frequency. (The frequency f is programmable. Or equivalently, the frequency $f_0$ and $\Delta f$ may be programmable.) The power splitter PS is configured to split the tone N ways. The N tones from the power splitter are identical in phase and amplitude (or at least approximately so). Thus, each receiver sees the same input tone during calibration mode. The power splitter may be a passive device.

In some embodiments, a computer 510 may couple to the receivers and the signal generator SG through a communication medium 515, e.g., a system of one or more interconnecting buses. The computer 510 may be responsible for calibrating the receivers to achieve the desired synchronization of the receivers. The computer 510 may send information (e.g., commands, requests, control signals, configuration parameters) to the receivers, the signal generator SG and perhaps also the power splitter PS through medium 515. Furthermore, computer 510 may receive the baseband sample sequences $y_1(k), y_2(k), \ldots, y_N(k)$ generated by the receivers via the communication medium 515.

The computer may sweep the tone frequency f through the designated frequency band one or more times. (A sweep of the tone frequency may involve repeatedly incrementing the displacement frequency $\Delta f$ so that the frequency $f = f_0 + \Delta f$ covers the frequency band.)

Figure 5:
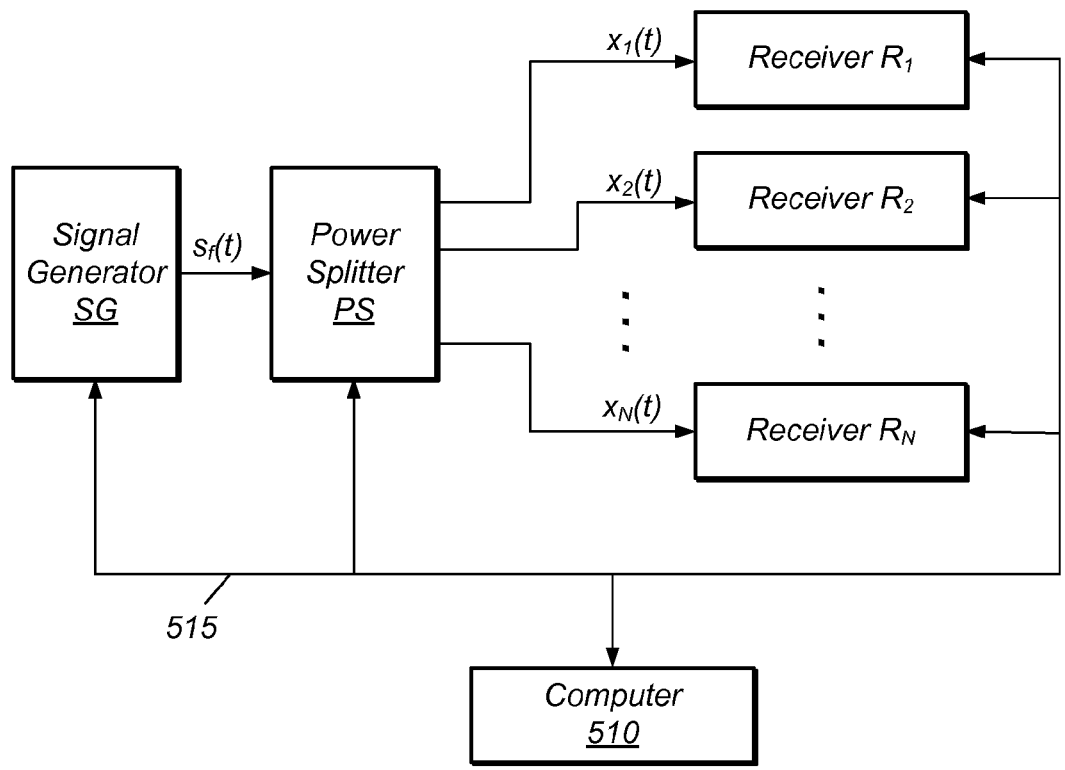
FIG. 5 illustrates another embodiment of the hardware configuration for calibrating the acquisition system.
Figure 5B:
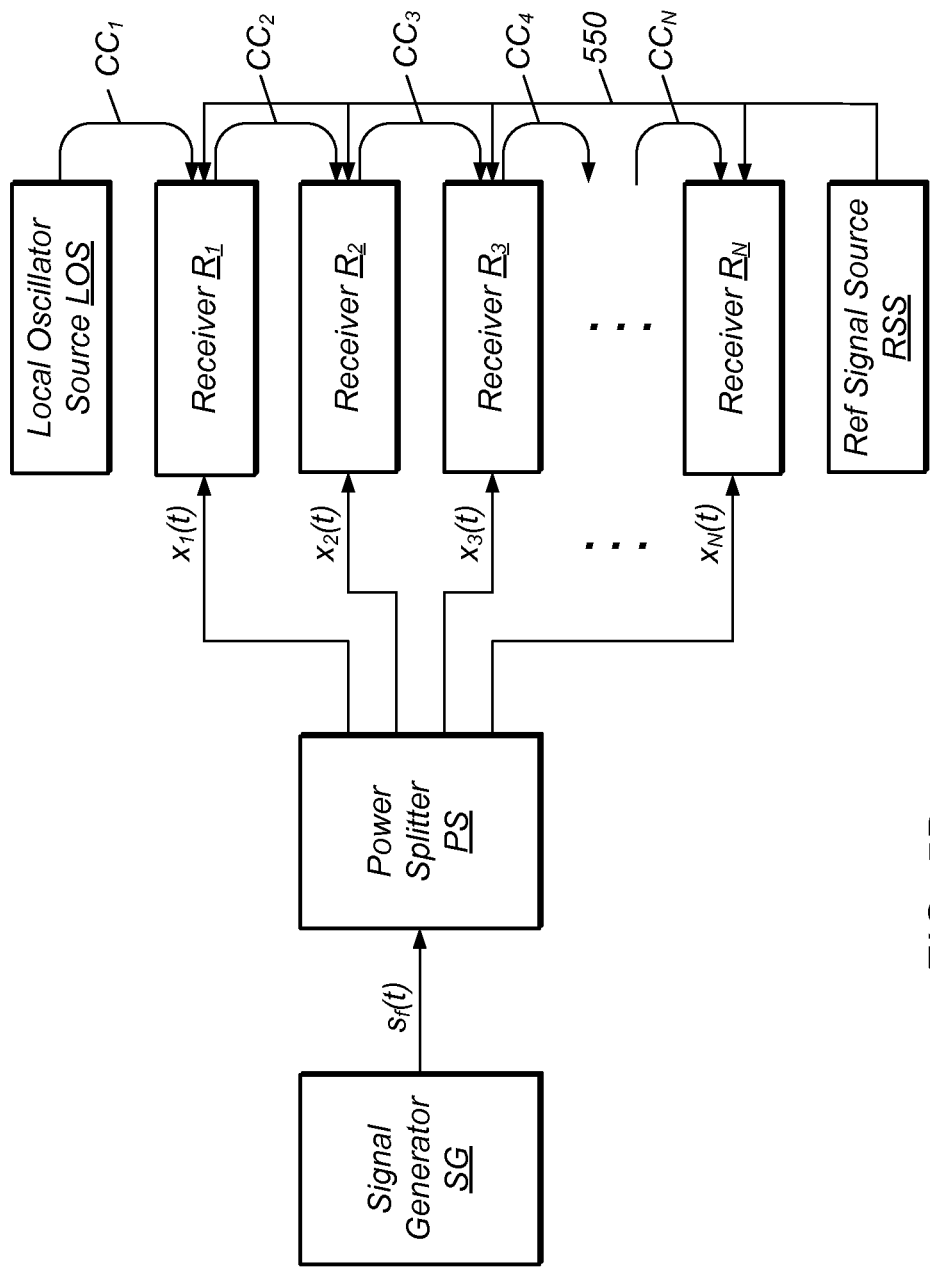
FIG. 5B illustrates one embodiment for the distribution of a local oscillator signal and a reference clock signal to the receivers of the acquisition system.

In some embodiments, the receivers $R_1, R_2, \ldots, R_N$ may be configured to share local oscillator signals as shown FIG. 5B. (The computer 510 and its connections to other system components are not shown in FIG. 5B. However, this omission is merely for the sake of diagrammatic simplicity.) The receiver $R_1$ receives the local oscillator signal from a local oscillator source LOS through a cable connection $CC_1$. The receiver $R_2$ receives a copy of the local oscillator signal from the receiver $R_1$ through a cable connection $CC_2$. The receiver $R_3$ receives a copy of the local oscillator signal from the receiver $R_2$ through a cable connection $CC_3$, and so on. Furthermore, each receiver may be configured to receive a reference signal from a reference signal source RSS through a bus 550 (e.g., a bus in the backplane of a chassis in which the receivers are mounted).

When synchronization has been achieved, the power splitter may be disconnected from the receivers, and the receivers may transition to an operational mode where the input signals $\{x_i(t)\}$ are received, e.g., from respective antenna input ports. (MIMO systems may use a plurality of antennas to capture a wavefield from different points in space. MIMO is an acronym for "multiple-input multiple-output". The "inputs" and "outputs" of MIMO are interpreted from the point of view of the transmission channel.)

In one set of embodiments, a computer-implemented method 600 for synchronizing a plurality of receiver channels may include the actions shown in FIG. 6. (The method 600 may include any subset of the features described above and/or any subset of the features described below in connection with FIGS. 7-19.) The method 600 may be performed by a computer, e.g., the computer 510 of FIG. 5 and/or the computer of FIG. 19.

At 610, the computer may calibrate the plurality of receiver channels. The action of calibrating the receiver channels synchronizes the plurality of receiver channels. One of the receiver channels is designated as a master channel, and the one or more remaining receiver channels are designated as slave channels. Each of the receiver channels includes a signal path that is configured to operate on a respective input signal to obtain a respective baseband sample sequence. In particular, the signal path of each receiver is configured to down-convert the respective input signal to obtain a respective IF (intermediate frequency) signal, digitize the respective IF signal based on a respective sample clock to obtain a respective IF sample sequence, and digitally down-convert the respective IF sample sequence to obtain the respective baseband sample sequence. See, e.g., FIGS. 1-3.

The action 610 of calibrating the plurality of receiver channels may include performing a set S of operations for each of the slave channels. The operation set S may include operations 615 through 625 as shown in FIG. 6.

At 615, the computer may compute a relative frequency response between a slave channel and the master channel. The relative frequency response is based on the baseband sample sequence of the slave channel and the baseband sample sequence of the master channel. For example, the relative frequency response may be determined by dividing a Fourier transform of the slave channel's baseband sequence by a Fourier transform of the master channel's baseband sequence. As is typical in the art of digital signal processing, the baseband sequences may be windowed prior to computation of the Fourier transforms.

At 620, the computer may compute a digital filter for the slave channel based on the relative frequency response. The digital filter is configured (i.e., computed) to compensate for non-uniformity in amplitude of the relative frequency response and for a deviation of phase of the relative frequency response from a linear approximation of the phase of the relative frequency response. (The amplitude of the relative frequency response is said to be "uniform" when it is equal to one across the frequency band being calibrated.) In other words, the digital filter is designed so that after the slave channel implements the digital filter, the relative frequency response will more closely approximate a linear phase shift as a function of frequency.

The linear approximation may be least squares fit to the phase of the relative frequency response. However, more generally, any known method may be used to obtain the linear approximation to the phase.

Any of a variety of known methods may be used to compute the digital filter based on the relative frequency response. In one embodiment, the digital filter may be computed using the least Pth norm algorithm. (That algorithm is provided in the National Instruments Digital Filter Design Toolkit.)

At 625, the computer may program a digital circuit of the slave channel to implement the digital filter. The programming operation may involve storing the digital filter (e.g., coefficients specifying the digital filter) to a memory used by the digital circuit. After the programming operation, the digital circuit of the slave channel applies the digital filter to the respective IF sample sequence prior to the digital down-conversion of the respective IF sample sequence.

In some embodiments, the action 610 of calibrating the receiver channels also includes executing a first computer program that causes the sample clocks of the receiver channels to be more closely aligned in time than prior to the execution of the first computer program. The action of computing the relative frequency response for each of the slave channels is performed after having executed the first computer program. For more information on the operation of the first computer program, see step II in the description below of the calibration routine. In some embodiments, the first program may be the NI-TClk synchronization software.

In some embodiments, the set S of operations, which is performed for each of the slave channels, also includes the following operations. First, an updated relative phase response is computed between the slave channel and the master channel after having performed the programming operation 625. The updated relative phase response is computed using an acquisition of the slave channel's baseband sample sequence and the master channel's baseband sample sequence after having performed the programming operation 625. Second, a slope of the updated relative phase response is computed, e.g., by performing a least squares fit. Third, the computer directs the slave channel to apply a time delay to its signal path. The value of the time delay is based on the computed slope. For example, if the slope value m is calculated in units of radians per Hz, the time delay τ in seconds is related to the slope value m by the expression:

$$\tau = m/(2\pi).$$

Alternatively, if the slope value m is calculated in units of degrees per Hz, the time delay τ in seconds is related to the slope value m by the expression:

$$\tau = m/360.$$

As yet another alternative, the slope value m may be calculated in units of seconds, in which case τ equals m.

The application of the time delay at least approximately removes (compensates for) the slope of the updated relative phase response.

In some embodiments, the action of directing the slave channel to apply the time delay to its signal path may include adjusting a phase of the sample clock of the slave channel based on the computed slope. In these embodiments, each receiver includes sample clock generation circuitry with a phase control input. For example, the sample clock generation circuitry may include a phase-locked loop (PLL) with a phase control DAC (digital-to-analog converter). A digital value written to the input register of the phase control DAC determines a phase adjustment of the sample clock signal.

In some embodiments, the set S of operations (which is performed for each of the slave channels) also includes modifying the digital filter of the slave channel to include the above-described time delay. In these embodiments, the action of directing the slave channel to apply the time delay includes programming the digital circuit of the slave channel to implement the modified digital filter. For example, in one embodiment, the modified digital filter may comprise the serial concatenation of the original digital filter (of step 620) and a second digital filter configured to implement the time delay.

In some embodiments, the set S of operations also includes designing a new digital filter for the slave channel so that new digital filter incorporates the original filter design constraints as well as the above-described time delay. In these embodiments, the action of directing the slave channel to apply the time delay includes programming the digital circuit of the slave channel to implement the new digital filter.

Figure 14:
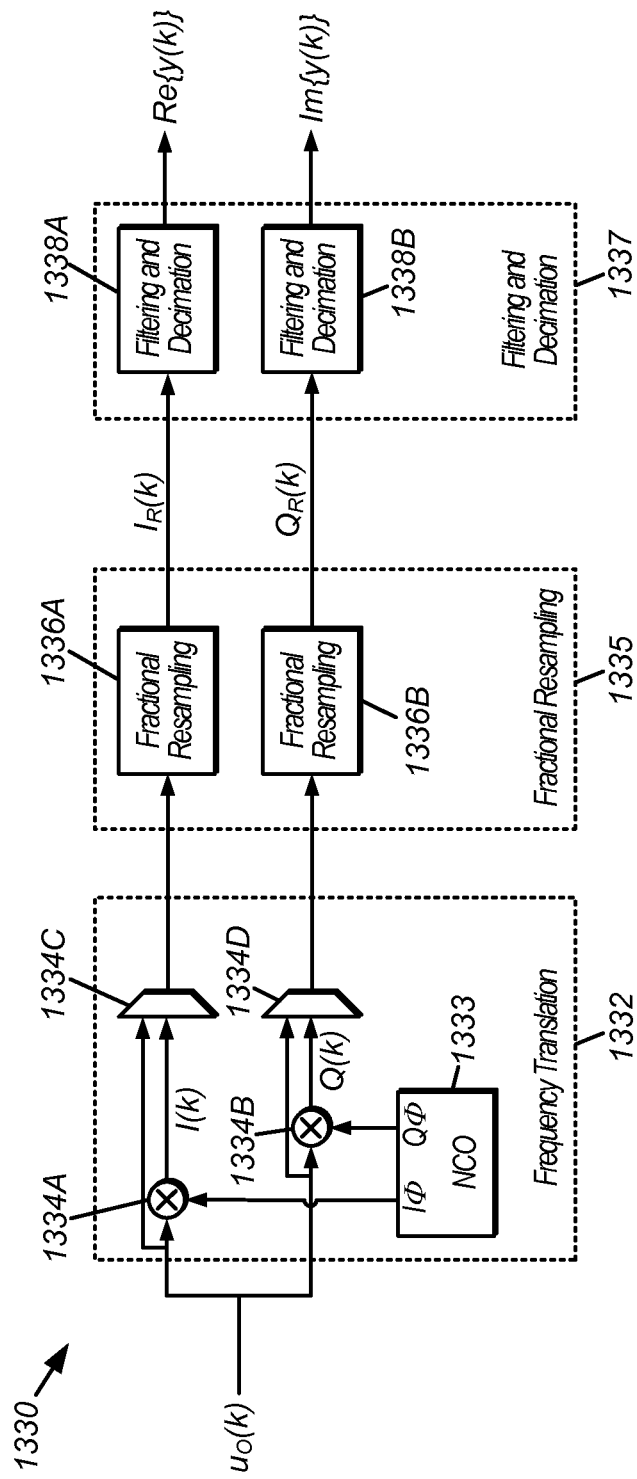
FIG. 14 illustrates one embodiment of the signal processor 1330 of the digital processing module.

In some embodiments, the set S of operations also includes generating coefficients for a fractional resampler. The coefficients are computed so that the fractional resampler realizes the above-described time delay. In these embodiments, the action of directing the slave channel to apply the time delay may include programming the digital circuit to implement the fractional resampler in addition to the digital filter of step 620. Alternatively, the slave channel may include fractional resampling circuitry in its signal path, e.g., as shown in FIG. 14. Thus, the action of directing the slave channel to apply the time delay may include transferring the fractional resampler coefficients to parameter memory used by the fractional resampling circuitry.

In some embodiments, the set S of operations (which is performed for each of the slave channels) also includes the following operations. First, the computer computes a second updated relative phase response between the slave channel and the master channel after having directed the slave channel to apply the time delay to its signal path. The second updated relative phase response is computed based on acquisitions of the slave channel's baseband sample sequence and the master channel's baseband sample sequence after having directed the slave channel to apply the time delay. Second, the computer may compute a residual slope of the second updated relative phase response, e.g., by performing a least squares fit.

Third, the computer may adjust a phase of the sample clock of the slave channel based on the computed residual slope.

In some embodiments, each of the receiver channels may include a corresponding numerically controlled oscillator (NCO) that is configured to generate an orthogonal pair of digital sinusoids having programmable phase and programmable frequency. See, e.g., NCO 1333 of FIG. 14. In these embodiments, the set S of operations (which is performed for each of the slave channels) may also include the following operations. First, the computer may compute a third updated relative phase response between the slave channel and the master channel after adjusting the phase of the sample clock of the slave channel (based on the computed residual slope). The third updated relative phase response is computed based on acquisitions of the slave channel's baseband sample sequence and the master channel's baseband sample sequence after adjusting the phase of the sample clock of the slave channel. Second, the computer may compute an average phase value of the third updated relative phase response over frequency. Third, the computer may adjust the phase of the slave channel's numerically controlled oscillator in order to remove the average phase value from the third updated relative phase response.

In some embodiments, the designation of which receiver channel is to be the master channel is software controlled. For example, the computer may provide a graphical user interface (GUI) through that allows a user to select which of the receiver channels is to be the master.

In some embodiments, each of the receiver channels is configured to digitally generate a respective trigger clock from the respective sample clock signal. The trigger clock of each slave channel is used to condition (i.e., selectively enable) reception of a trigger signal. The trigger signal is used to determine a time to start acquisition of the slave channel's baseband sample sequence into memory.

In one set of embodiments, a computer-implemented method 700 for synchronizing a second receiver with respect to a first receiver may include the actions shown in FIG. 7. (The method 700 may include any subset of the features described above and/or any subset of the features described below in connection with FIGS. 8-19.) The method 700 may be performed by a computer, e.g., the computer 510 of FIG. 5 and/or the computer of FIG. 19.

At 710, the computer may calibrate the second receiver. The action of calibrating the second receiver synchronizes the second receiver to the first receiver. Each receiver includes a signal path that is configured to: receive a respective input signal, down-convert the respective input signal to obtain a respective intermediate frequency (IF) signal, digitize the respective IF signal based on a respective sample clock to obtain a respective IF sample sequence, digitally down-convert the respective IF sample sequence to obtain a respective baseband sample sequence. See, e.g., FIG. 1-3. The action 710 of calibrating the second receiver may include performing operations 715 through 725 as shown in FIG. 7.

At 710, the computer may compute a relative frequency response of the second receiver with respect to the first receiver based on the baseband sample sequence of the second receiver and the baseband sample sequence of the first receiver, e.g., as described above in connection with FIG. 6.

At 715, the computer may compute a digital filter for the second receiver based on the relative frequency response. The digital filter is configured to compensate for non-uniformity in amplitude of the relative frequency response and for a deviation of phase of the relative frequency response from a linear approximation of the phase of the relative frequency response.

At 720, the computer may program a digital circuit of the second receiver to implement the digital filter. After this programming operation, the digital circuit may apply the digital filter to the IF sample sequence of the second receiver prior to the digital down-conversion of the IF sample sequence.

In some embodiments, the action 710 of calibrating the second receiver also includes executing a first computer program that causes the sample clock of the second receiver to be more closely aligned in time to the sample clock of the first receiver, e.g., as described above in connection with FIG. 6. In these embodiments, the operation 715 of computing the relative frequency response is performed after having executed the first computer program.

In some embodiments, the action 710 of calibrating the second receiver also includes: computing an updated relative phase response of the second receiver relative to the first receiver after having performed the programming operation 720; computing a slope of the updated relative phase response; and directing the second receiver to apply a time delay to its signal path. (The value of the time delay is based on the computed slope.) The second receiver may implement the time delay in various ways, e.g., in the ways described above in connection with FIG. 6.

In some embodiments, the action 710 of calibrating the second receiver also includes: computing a second updated relative phase response of the second receiver relative to the first receiver after having performed the action of directing the second receiver to apply the time delay to its signal path; computing a residual slope of the second updated relative phase response; and adjusting a phase of the sample clock of the second receiver based on the residual slope.

In some embodiments, the second receiver includes a numerically controlled oscillator configured to generate an orthogonal pair of digital sinusoids having programmable phase and programmable frequency. In these embodiments, the action 710 of calibrating the second receiver also includes: computing a third updated relative phase response of the second receiver relative to the first receiver after having performed the action of adjusting the phase of the sample clock of the second receiver; computing an average phase value of the third updated relative phase response; and adjusting the phase of the numerically controlled oscillator of the second receiver in order to remove the average phase value.

Figure 3:
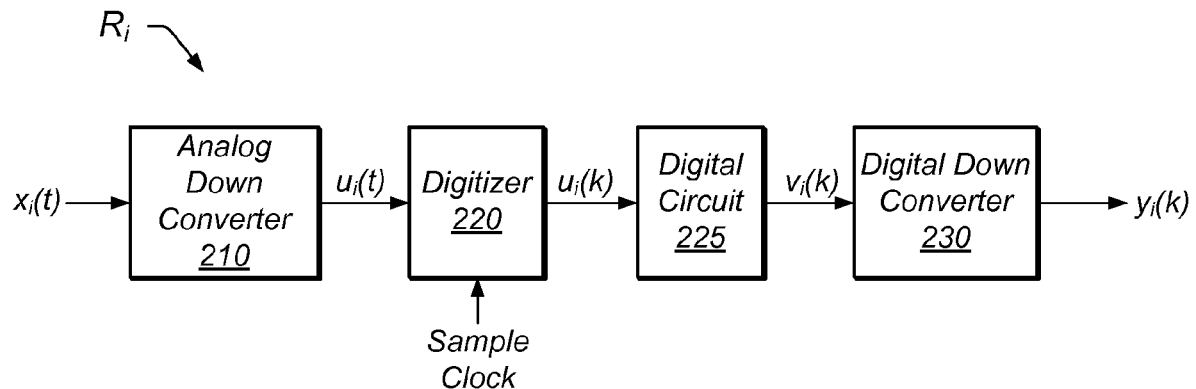
FIG. 3 illustrates another embodiment of a generic one of the receivers of FIG. 1.

In some embodiments, an RF acquisition system may be calibrated using an automated calibration routine as described below. (Any subset of the features of that automated calibration routine may be incorporated into any of the synchronization methods described above, and vice versa.) The RF acquisition system includes a plurality of receiver channels, e.g., as illustrated in FIGS. 1-3. The calibration routine allows a user of the RF acquisition system to match the IF frequency responses of the channels, i.e., to achieve the condition that the IF frequency responses of the channels are identical (or, at least approximately equal). One channel is designated as the master; the others are slaves. (The channel that is selected to be the master may be software programmable.) Thus, each slave channel may be adjusted so that its IF frequency response (i.e., both its IF magnitude response and its IF phase response) is matched to the IF frequency response of the master channel.

The number of channels in the RF acquisition system may be flexible, to suit the user's requirements. The calibration routine may be designed to calibrate an RF acquisition system having any number of channels. The number of channels may be provided as a user input to the calibration routine. (Alternatively, the number of channels may be determined by interrogating the RF acquisitions system or its software drivers.)

In one embodiment, the instantaneous IF bandwidth (BW) of each channel is assumed to be 50 MHz. However, the inventive principles described herein do not depend on any specific value of the instantaneous IF bandwidth. (The instantaneous IF bandwidth is the bandwidth of the spectrum that is downconverted from RF to IF frequencies via analog downconversion, and that is available simultaneously to be digitized or acquired in some way. It is the amount of spectrum available at the same time without having to retune the downconverter's LO.)

In one embodiment, RF acquisition system includes PXI products or RF vector signal analyzer (VSA) products provided by National Instruments. (PXI is an acronym for "PCI eXtensions for Instrumentation".)

In one embodiment, the calibration routine is implemented as a computer program using a graphical programming language such as LabVIEW™, which is provided by National Instruments. However, a wide variety of other programming languages may be used.

The calibration routine may involve measuring the differences in phase response and amplitude response between each slave and the master, and correcting for those differences, i.e., making adjustments in order to eliminate or minimize those differences. The adjustments may be made using technology and/or product features provided by the RF acquisition system. For example, in some embodiments, some of the adjustments may be made using one or more routines provided by the NI-TClk Synchronization software provided by National Instruments and/or one or more routines provided by the NI-Scope instrument driver software provided by National Instruments.

In some embodiments, the calibration routine calibrates the RF acquisition system so that, in its calibrated state, the RF acquisition system can be used to measure small differences in relative amplitude and phase between any pair of the channels.

Many military and government communication applications require multi-channel RF acquisition systems where each of the channels has the ability to capture wide instantaneous bandwidths (to facilitate working with modulated communication signals). Furthermore, each channel may need to have an approximately flat relative frequency response with respect to the master channel (so as to not introduce channel-specific signal distortion). The relative frequency response of a given channel with respect to the master channel is the ratio of the frequency response of the given channel to the frequency response of the master channel. A relative frequency response to said to be "flat" when its amplitude response is equal to unity over the bandwidth of interest (with small amplitude ripple), and its phase response is zero over the bandwidth of interest (with small group delay ripple).

With the advent of newer consumer-oriented communications standards (such as IEEE 802.11n, IEEE 802.11 ac, and LTE) that make use of multiple antennas, multiple channels and multiple spatial streams to increase data bandwidth, there is potential use of multi-channel RF acquisition systems in consumer-oriented markets as well.

In some embodiments, the calibration routine may be hardware-specific, i.e., designed to calibrate an RF acquisition system composed from specific types of receiver devices, e.g., vector signal analyzers (VSAs). The qualifier "vector" is meant to imply that the signal analyzer is configured to analyze a complex signal, which is also known as a vector signal.

In some embodiments, the RF acquisition system may include two or more vector signal analyzers supplied by National Instruments. (However, it should be understood that the inventive principles described herein are not limited to use with the hardware devices of any one manufacturer or supplier.) In some embodiments, the calibration routine may support the calibration of RF acquisition systems including two or more National Instruments VSA products, e.g., VSA products such as: NI PXI-5663, NI PXI-5663E, NI PXI-5665 (3.6 GHz), NI PXI-5665 (14 GHz).

The calibration routine may adjust the IF frequency responses of the slave channels in an RF acquisition system so that the slave channels' IF responses more closely match the master channel's IF response in both magnitude and phase.

Once the calibration routine has completed, the relative amplitude response between each slave and the master may be approximately flat across the extent of IF frequency bandwidth and may be centered at 0 dB. Furthermore, the relative phase response between each slave and the master may be approximately flat across the extent of IF frequency bandwidth and may be centered at zero degrees.

In some embodiments, the receiver channels of the RF acquisition system may be mounted in the slots of a chassis (e.g., a PXI chassis or some other type of chassis). Furthermore, a control computer may be coupled to the chassis. The calibration routine may execute on the control computer. The control computer may be mounted in a slot of the chassis. (The control computer may communicate with the receiver channels through a backplane of the chassis.) Alternatively, the control computer may couple to the channel through a connecting bus.

To support the calibration process, a signal generator and a power splitter may be arranged, e.g., as shown in FIGS. 4 and 5. The signal generator and/or the power splitter may also be mounted in slots of the chassis. The control computer may communicate with the signal generator through the backplane of the chassis.

In some embodiments, the receiver channels are vector signal analyzers. In one embodiment, each vector signal analyzer (VSA) includes at least an analog downconversion module and a digital processing module. Thus, each VSA may take up at least two slots in the chassis. The analog downconversion module may downconvert a received RF signal from RF to IF. The digital processing module may digitize the IF signal and perform digital I/Q downconversion from IF to baseband.

In some embodiments, there is also an LO module for creating the LO signal used for analog downconversion. This LO signal may be fed to the master downconverter, and subsequently daisy-chained to each slave downconverter. The LO module may be interpreted as belonging to the master VSA. Thus, the master VSA takes up three slots (for the master downconverter module, the master digital processing module, and the LO module), while each slave VSA takes up two slots.

In one embodiment, the chassis is a PXIe-1075 18-slot chassis, and up to four PXIe-5665 (3.6 GHz) VSAs in phase-coherent configuration are mounted in the chassis along with an embedded PXIe controller and a PXIe-5652 6.6 GHz RF signal generator. The RF signal generator provides a stimulus signal which is used during calibration. A power splitter (e.g., a 4-way power splitter) may split the tone generated by the signal generator to into N resultant tones. The N resultant tones may then be supplied to the N input ports of the N respective VSAs through N respective cables. (In alternative embodiments, the N resultant tones may be supplied to the N respective VSAs via wireless connections.) For instance, a transmitting antenna may be situated at a distance from the receivers. The calibration of the receivers would take into account this distance from the transmitting antenna.

In some embodiments, the power splitter may be high quality power splitter, implying close to equal splitting of power among the N resultant tones and close to equal phase shift among the N resultant tones. In some embodiments, the N cables from the output of the splitter to the input ports of the VSAs may be of equal length and have identical (or approximately identical) magnitude and phase responses.

Overview

Phase-Coherent Vector IF Calibration Routine

In some embodiments, the calibration routine may include one or more of the following steps. (Any subset of these steps or the features described in connection with these steps may be incorporated in method 600 and/or method 700.)

1. Configure the settings of the vector signal analyzers (VSAs).

2. Coarsely align the ADC sample clocks of the VSAs, e.g., using NI-TClk™ technology.

3. Measure the relative frequency response (i.e., the relative amplitude response and relative phase response) of each slave channel with respect to the master channel.

4. Calculate and apply a custom digital filter for each slave channel. The digital filter is designed to correct for deviation of the slave channel's relative frequency response from unity response. (Unity response is the condition where the relative frequency response is identically equal to one over the frequency band of interest.) Each VSA may include a programmable filter circuit that operates on the corresponding sampled IF signal prior to digital downconversion to baseband.

5. Re-measure the relative phase response of each slave channel with respect to the master after the application of the calculated digital filters.

6. Calculate a coarse residual skew between each slave channel and the master channel based on the measurement of relative phase response, and compensate for the coarse residual skew, e.g., by adjusting the ADC sample clock of the slave channel. (Sample clock adjustment features are available as a part of NI-TClk™ technology.) Alternatively, the coarse residual skew could be compensated for by using the same programmable filter circuit used in step 4.

7. Re-measure the relative phase response of each slave channel with respect to the master channel after compensating for the coarse residual skew.

8. Calculate a fine residual skew between each slave channel and the master channel based on the corresponding relative phase response of step 7, and compensate for the calculated fine residual skew, e.g., using the sample clock adjustment features provided by NI-Scope™ software. Alternatively, the fine residual skew may be compensated for using the same programmable filter circuit used in step 4.

9. Re-measure the relative phase response of each slave channel with respect to the master after compensating for the fine residual skew.

10. Calculate the residual mean phase offset between each slave channel and the master channel based on the corresponding relative phase response of step 9, and apply a compensating value to onboard firmware of the corresponding VSA.

Figure 8:
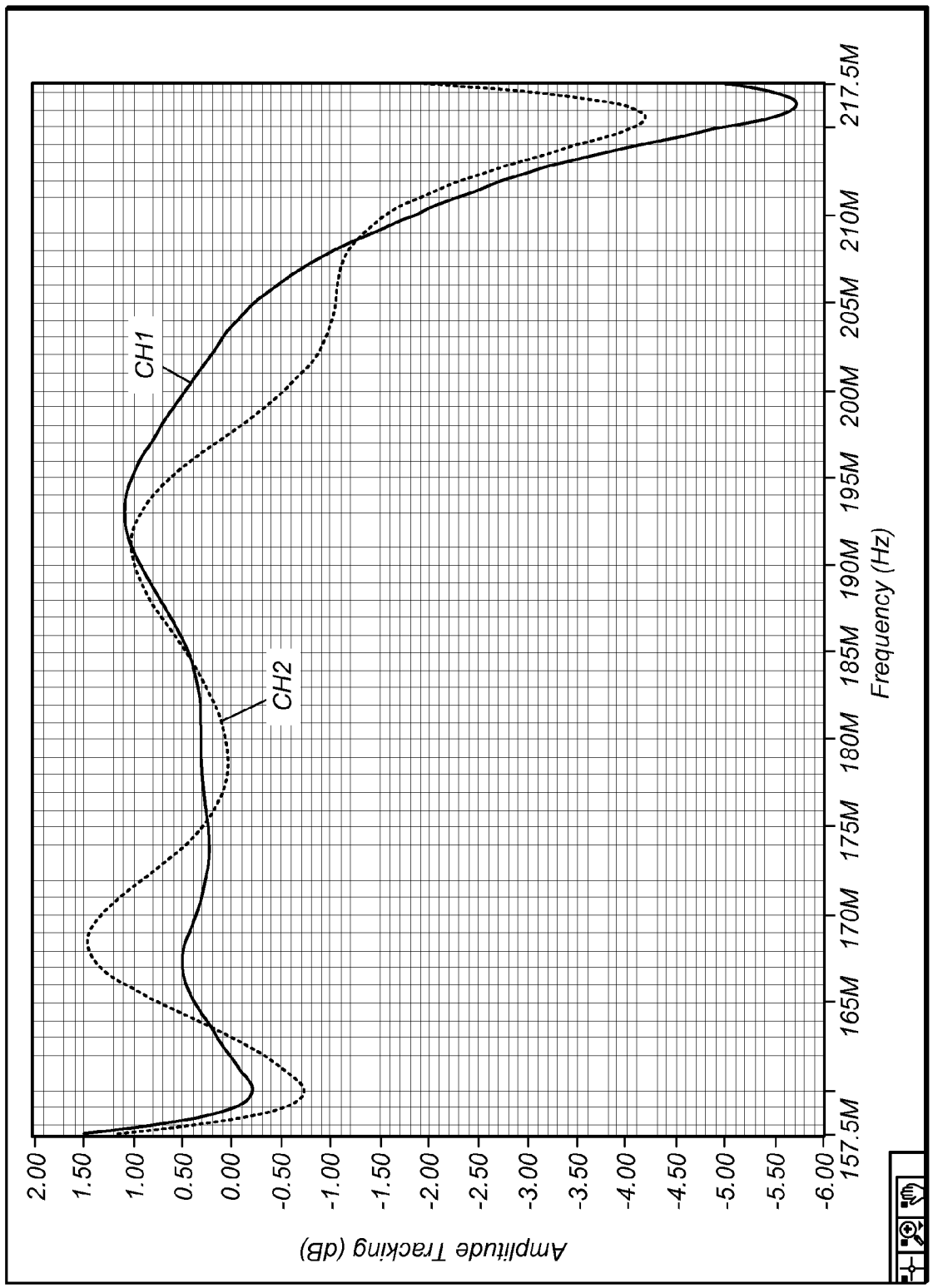
FIG. 8 shows the relative amplitude responses (also referred to as "amplitude tracking") of two slave VSA channels (CH1 and CH2) relative to a master VSA channel before calibration. (VSA is acronym for "vector signal analyzer".)
Figure 9:
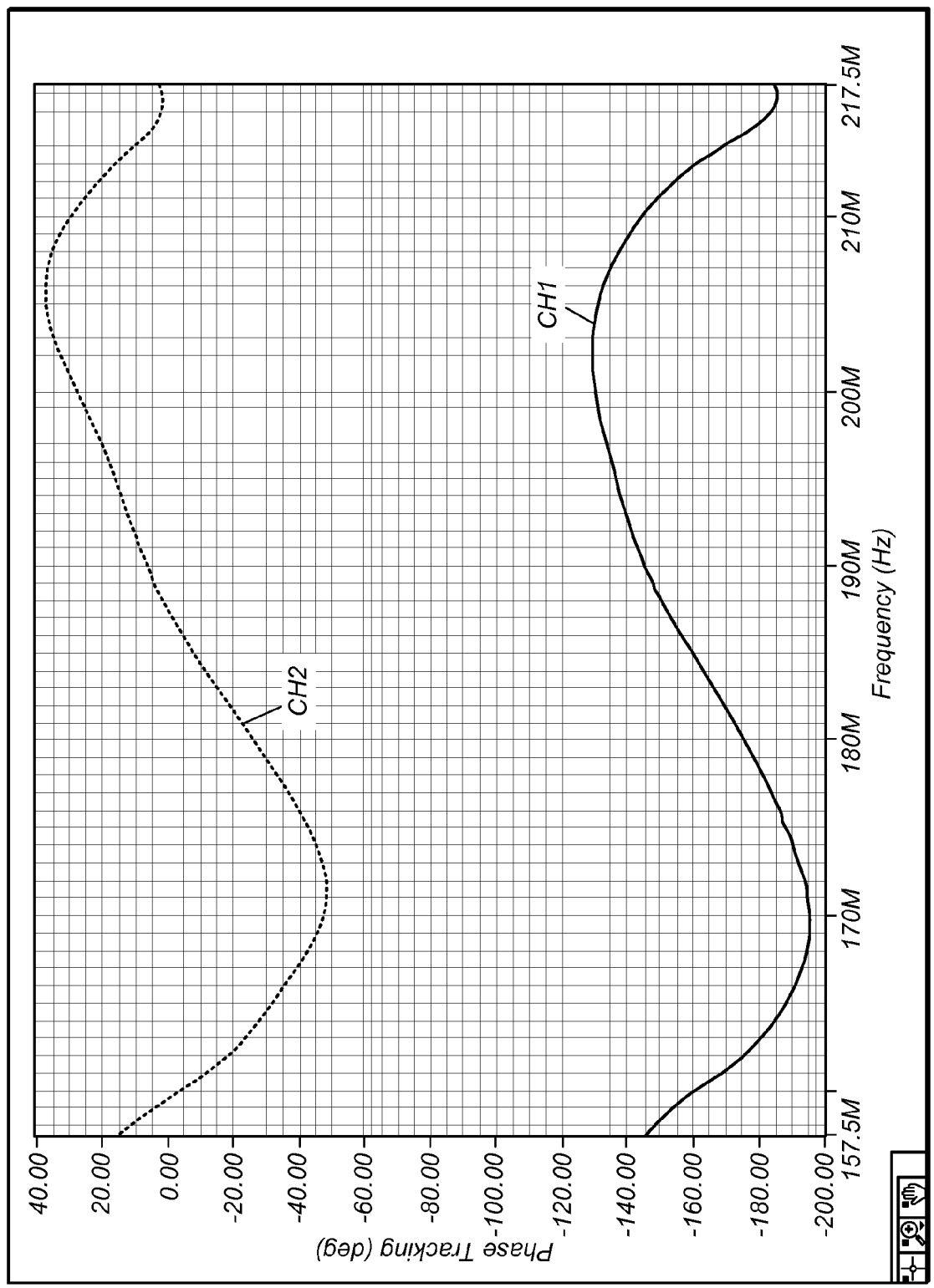
FIG. 9 shows the relative phase responses (also referred to as "phase tracking") of the two slave VSA channels (CH1 and CH2) relative to the master VSA channel before calibration.
Figure 10:
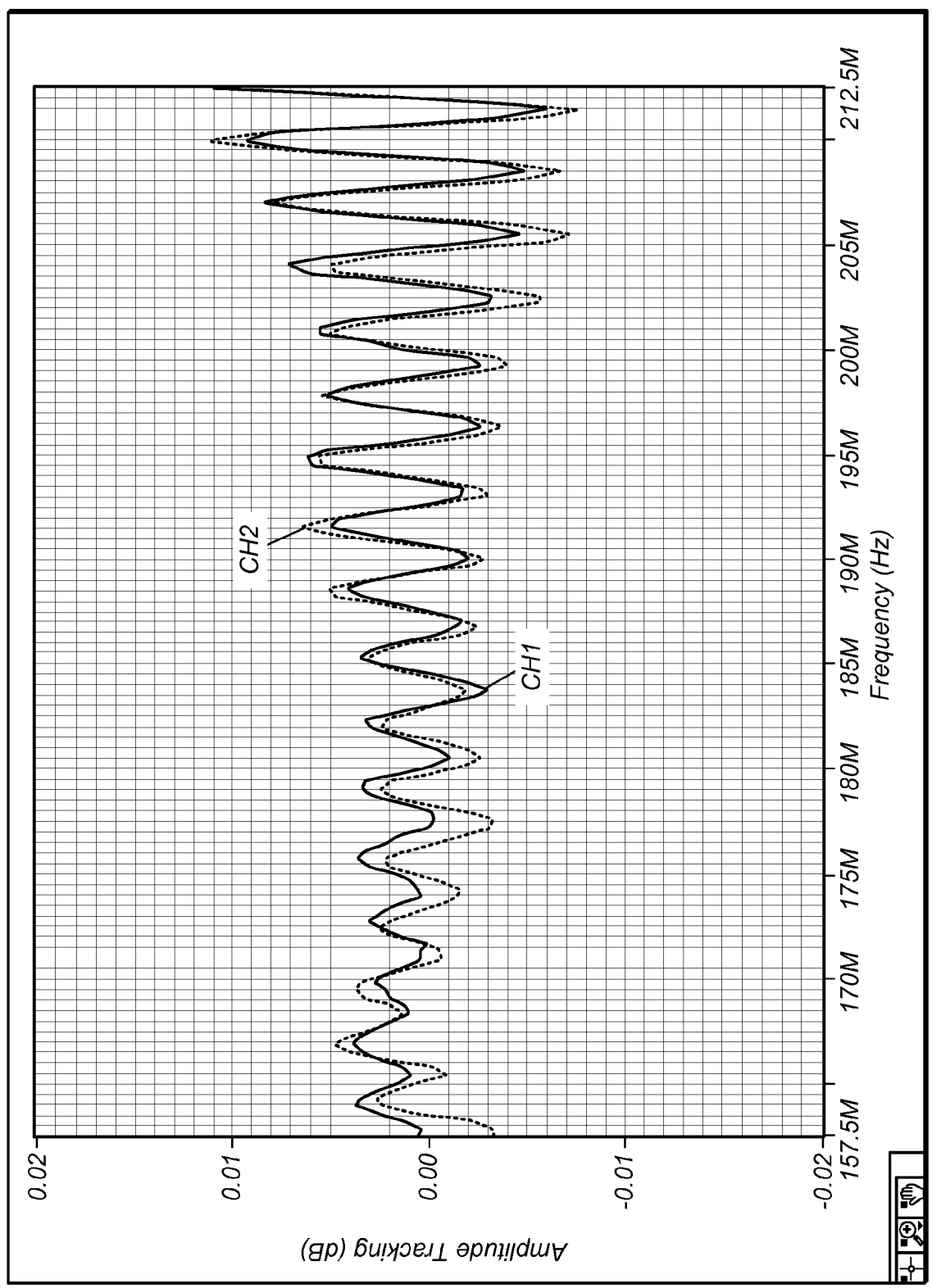
FIG. 10 shows the relative amplitude responses of the two slave VSA channels after calibration.
Figure 11:
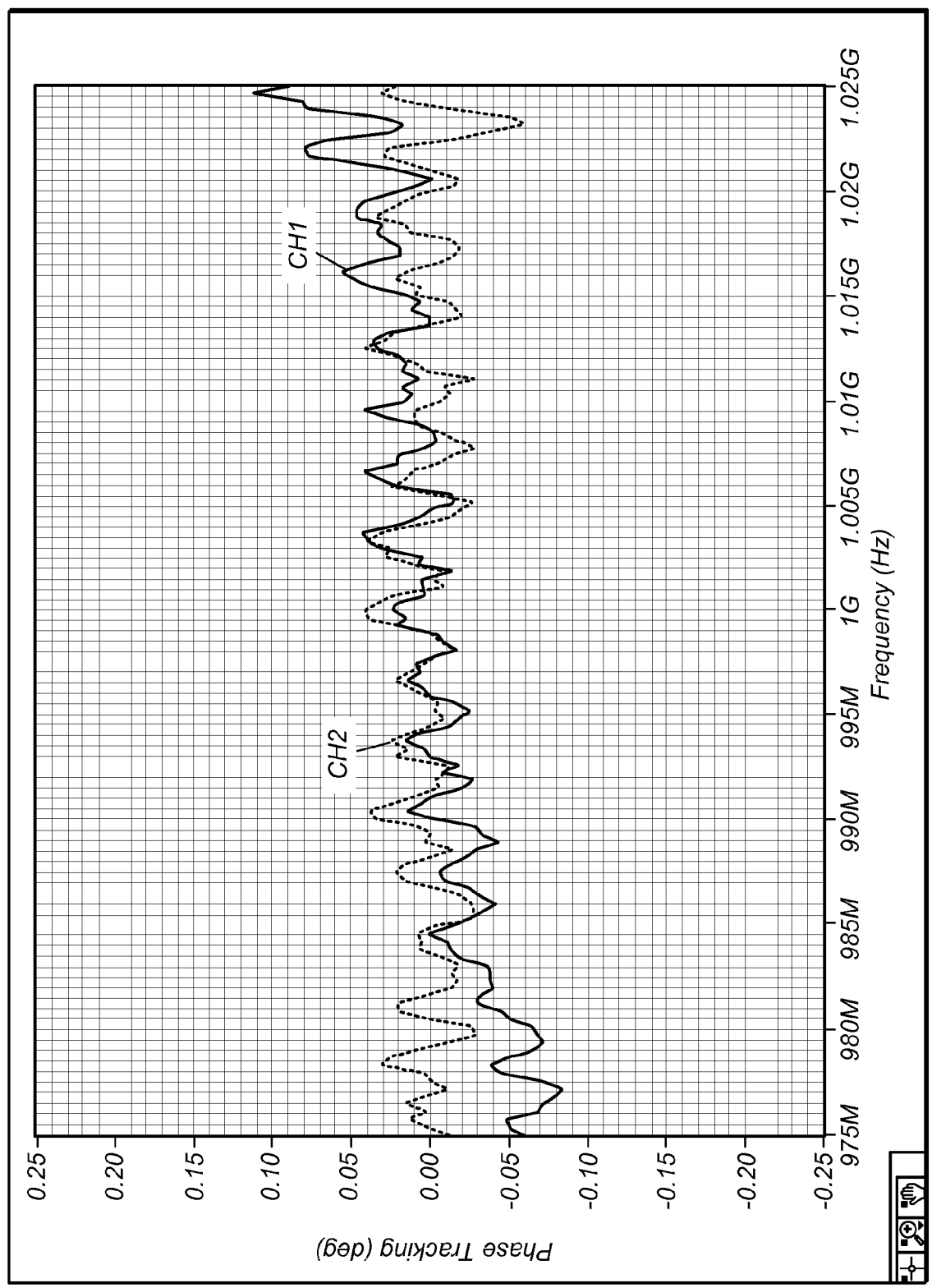
FIG. 11 shows the relative phase responses of the two slave VSA channels after calibration.

FIGS. 8-11 illustrate an example of the differences in relative amplitude and phase responses before and after calibration. (FIGS. 8 and 9 are before calibration. FIGS. 10 and 11 are after calibration.) This example is provided to lend insight to the reader. The system parameter values given in this example are not meant to limit the scope of applicability of the present invention.

FIG. 8 shows the relative amplitude responses (also referred to as "amplitude tracking") of two respective slave VSA channels (CH1 and CH2) relative to a master VSA channel in a three-channel RF acquisition system before calibration.

FIG. 9 shows the relative phase responses (also referred to as "phase tracking") of the two respective slave VSA channels (CH1 and CH2) relative to the master VSA channel before calibration.

FIG. 10 shows the relative amplitude responses of the two respective slave VSA channels relative to the master VSA channel after calibration. Note that the vertical scale is greatly expanded as compared to FIG. 8 and that the two responses are clinging close to 0 dB. The peak-to-peak ripple of each relative amplitude response is greatly reduced by the calibration routine.

FIG. 11 shows the relative phase responses of the two respective slave VSA channels relative to the master VSA channel after calibration. Note that the vertical scale is greatly expanded as compared to FIG. 9 and that the responses are clinging close to 0 degrees. The peak-to-peak ripple of each relative phase response is greatly reduced by the calibration routine.

FIG. 12 shows data for the master channel in the left column and data for the two slave channels in the next two columns. The data for each channel (master or slave) includes center frequency, reference level, preamplifier enable status, impulse response, sample clock delay, phase DAC control code, phase offset, DC temperature, digitizer temperature and LO temperature. Some of the data items (e.g., the impulse response, the sample clock delay, phase DAC code and phase offset) are configuration settings. The calibration routine determines the configuration settings for each slave channel so as to match each slave channel's IF response to the master's IF response.

In some embodiments, the calibration routine does not change configuration settings of the master channel. Rather, the calibration routine may use the master channel as the reference to which the slave channels are brought into agreement.

Figure 13:
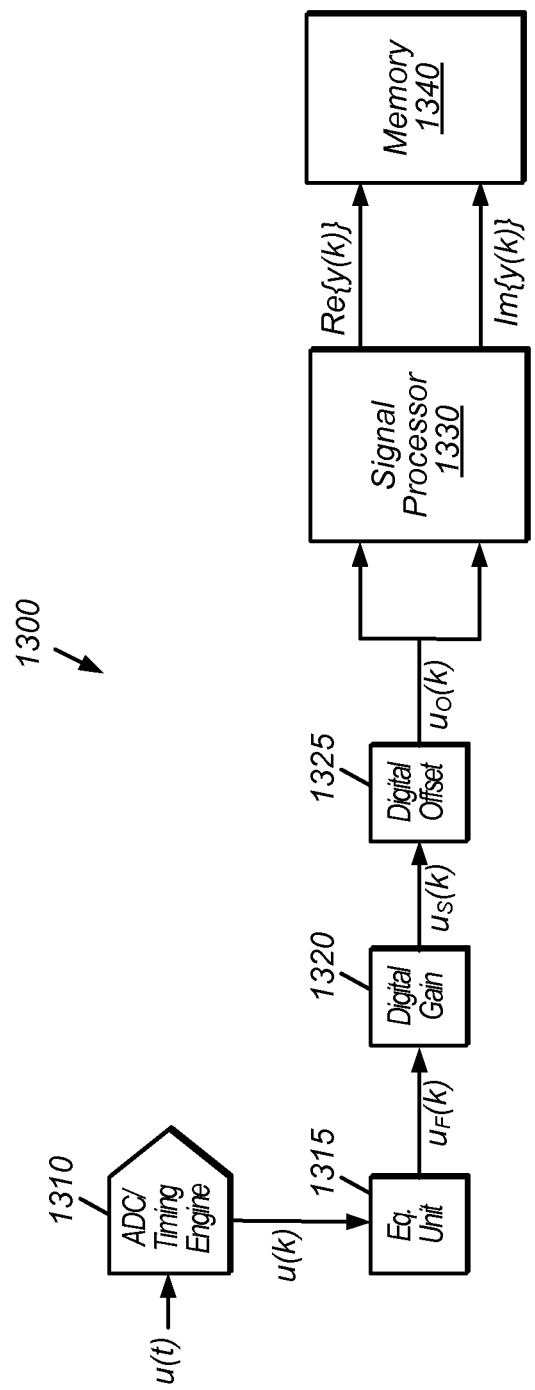
FIG. 13 illustrates one embodiment of a digital processing module of a vector signal analyzer.

In some embodiments, each VSA includes a digital processing module 1300 as shown in FIG. 13. (The digital processing module 1330 may also be referred to herein as the "digitizer module".) The digital processing unit may include a unit 1310, an equalization unit 1315, a signal processor 1330 and memory 1350. The digital processing unit may also include a digital gain unit 1320 and a digital offset unit 1325. The digital processing module 1300 may be configured automatically by a software driver executing on the control computer, and may operate transparently to the user. In one embodiment, the digital processing module 1330 is a PXIe-5622 module produced by National Instruments.

The unit 1310 includes an analog-to-digital converter (ADC). The ADC digitizes the analog IF signal u(t) to obtain an IF sample sequence u(k). The unit 1310 may also include a timing engine that is configured to provide the ADC with a sampling clock.

The equalization unit 1315 is configured to digitally filter the IF sample sequence u(k) to obtain a filtered sequence $u_F(k)$. The equalization unit 1315 may be programmable. (The control computer may determine the digital filter used by the equalization filter by storing impulse response coefficients in a memory used by the equalization filter.) The default digital filter used by the equalization unit may be configured to flatten or equalize the analyzer's absolute IF response in order to improve overall performance of the analyzer. (The term "analyzer" is used herein as a shorthand for "vector signal analyzer".) The impulse response of the equalization filter may be automatically calculated by a software driver based on calibration information which has been measured and stored in onboard non-volatile memory during production of the analyzer. ("Onboard memory" means memory within the digital processing module 1300 or within the vector signal analyzer.) The calibration routine may overwrite the default driver-calculated digital filter with a custom digital filter, e.g., as described in step IV below. The equalization filter may be used to implement one or more of the compensation steps of the calibration routine. In some embodiments, the equalization filter is realized using one or more programmable hardware elements such as FPGAs.

The gain unit 1320 is configured to scale the filtered sequence $u_F(k)$ to obtain a scaled sequence $u_S(k)$, e.g., according to the relation $u_S(k)=\alpha u_F(k)$, where $\alpha$ is a non-zero constant. The constant $\alpha$ is programmable.

The offset unit 1325 is configured to apply an offset to the scaled sequence $u_S(k)$ to obtain an offset sequence $u_O(k)$, e.g., according to the relation $u_O(k)=u_S(k)+\beta$, where $\beta$ is a constant. The constant $\beta$ is programmable.

In some embodiments, the gain unit and the offset unit may also be implemented in a programmable hardware element, e.g., the same programmable hardware element as the equalization filter.

The offset sequence $u_O(k)$ is supplied to the signal processor 1330, which operates on the offset sequence to produce a complex baseband sequence $y(k)=\text{Re}\{y(k)\}+j\text{Im}\{y(k)\}$. The baseband sequence may be stored in memory 1340.

The signal processor 1330 may include a frequency translation unit 1332, a fractional resampling unit 1335 and a unit 1337 as shown in FIG. 14. The signal processing may be implemented by one or more programmable hardware elements, by a processor operating under the control of program instructions, by dedicated digital circuitry such as one or more ASICs, or any combination of the foregoing. The signal processor may be referred to herein as the "onboard signal processor" (OSP).

The frequency translation unit 1332 may include a numerically-controlled oscillator (NCO) 1333, digital mixers 1334A and 1334B, and multiplexers 1334C and 1334D. The NCO 1333 is configured to generate an orthogonal pair of digital tones (i.e., digital sinusoids) having programmable frequency and programmable phase. (The control computer may determine the frequency and phase by writing to appropriate registers used by the frequency translation unit.) The orthogonal pair of digital tones is used to digitally downconvert the IF signal samples from the ADC to baseband, thereby producing complex IQ samples. The orthogonal pair includes an inphase tone and a quadrature tone. The mixers 1334A and 1334B are configured to mix the offset sequence $u_O(k)$ respectively with the inphase tone and the quadrature tone to obtain respectively an inphase sequence $I(k)$ and a quadrature sequence $Q(k)$:

$I(k)=I\text{tone}(k)*u_O(k)$ $Q(k)=Q\text{tone}(k)*u_O(k)$.

The multiplexers 1334C and 1334D allow the mixers to be bypassed, if desired.

The software driver allows the phase of the NCO 1333 to be adjusted. (A program executing on the control computer may call one or more routines of the driver to effect the phase adjustment.) This phase adjustment may be used to remove the mean phase offset between the instant VSA (i.e., the VSA of which the NCO is a part) and the master VSA, e.g., as described in step X below.

The fractional resampling unit 1335 includes fractional resamplers 1336A and 1336B that are used to downsample the complex IQ samples $I(k)+jQ(k)$ from the ADC sample rate to a different sample rate (e.g., a user-specified IQ sample rate). Resampler 1336A is configured to fractionally resample the inphase sequence $I(k)$ to the different sample rate, and resampler 1336B is configured to fractionally resample the quadrature sequence $Q(k)$ to the different sample rate. The resampled sequences $I_R(k)$ and $Q_R(k)$ are supplied to the unit 1337. The fractional resampler may be programmable, e.g., its impulse response may be programmable. In some embodiments, the fractional resamplers may be employed to introduce a time delay into the complex sequence $I(k)+jQ(k)$. This time delay may compensate for skew between the sample clock of the present VSA and the sample clock of the master VSA.

The unit 1337 is configured to filter and/or decimate the resampled sequences $I_R(k)$ and $Q_R(k)$ to obtain the complex baseband sequence $y(k)$. The unit 1337 includes filter-and-decimation (FAD) units 1338A and 1338B. FAD unit 1138A is configured to filter and/or decimate the inphase resampled sequence $I_R(k)$ to obtain the real component of the baseband sequence $y(k)$; FAD unit 1338B is configured to filter and/or decimate the quadrature resampled sequence $Q_R(k)$ to obtain the imaginary component of the baseband sequence $y(k)$. The FAD units are preferably programmable. The control computer may determine specify the impulse responses to be used by each FAD unit.

Returning now to FIG. 13, the complex baseband sequence $y(k)$ generated by the signal processor 1330 may be stored in memory 1340. The memory 1340 is accessible by the control computer, e.g., through the backplane of the chassis.

Sample Clock Synchronization

NI-TClk is a National Instruments technology for synchronizing sample clocks on NI arbitrary waveform generator (AWG) products and high-speed digitizer products. NI-TClk routines may be used in one or more of the steps of the calibration routine. The following patents describe how NI-TClk is implemented and how it works: (A) U.S. Pat. No. 7,624,294, issued on Nov. 24, 2009, entitled "Synchronizing Measurement Devices Using Trigger Signals", invented by Craig M. Conway; and (B) U.S. Pat. No. 7,315,791, issued on Jan. 1, 2008, entitled "Application Programming Interface for Synchronizing Multiple Instrumentation Devices", invented by Kosta Ilic and Christopher T. Bartz.

Each of these patents is hereby incorporated by reference in its entirety.

The calibration routine may leverage the ability of NI-TClk to adjust an analyzer's ADC sample clock phase on a sub sample-period basis. NI-TClk has the ability to perform an automatic measurement of the sample clock skew between analyzers that are to be synchronized, and then make the appropriate compensating adjustments to the ADC sample clock phases of the analyzers. However, this automatic synchronization does not provide the necessary level of synchronization required for some applications since (1) the ADC sample clock alignment is not perfect, and (2) the automatic synchronization cannot take into account differences in propagation delay between the downconverter signal paths of the analyzers.

NI-TClk provides an interface (via LabVIEW™ subVIs and property nodes, or, via function calls for text-based programming languages) for user-created programs to adjust the sample clock phases of the VSAs. To improve on the automatic synchronization provided by TClk, the calibration routine may measure the residual skew of each slave VSA relative to the master VSA, and use this measurement to make a compensating adjustment to the slave VSA. For example, the compensating adjustment may involve adjusting the sample clock phase of the slave VSA using the TClk interface.

In some embodiments, the calibration routine may include one or more of the following steps.

I. Configure Settings of the RF Acquisition System

This step includes setting configuration parameters for the RF acquisition system. For example, the calibration routine may configure the VSA channels of the RF acquisition system to share local oscillator signals. "Sharing local oscillator signals" means that the master channel receives the local oscillator signal from a source, the master channel provides a copy of the local oscillator signal to the first slave module, the first slave module provides a copy of the local oscillator signal to the second slave module, and so on. (See FIG. 5B.) The source of the local oscillator signal may be a local oscillator module that is itself mounted in a slot of the chassis. The local oscillator module may be configured to lock the local oscillator (LO) signal to a reference clock (e.g., a reference clock provided through the chassis backplane).

In some embodiments, the calibration routine may configure each VSA channel to lock its sample clock to the reference clock. Furthermore, the calibration routine may set configuration parameters such as the RF center frequency and the reference level of each analyzer.

In some embodiments, an OCXO-quality timebase may be provided by the user to override the reference clock provided by the chassis backplane. (OCXO is an acronym for "oven controlled crystal oscillator". The term "timebase" is a synonym for reference clock.

In some embodiments, each channel of the RF acquisition system may include a programmable RF attenuator and a temperature measurement device. Furthermore, the system software driver may include the ability to read the current temperature from the temperature measurement device and to set (or adjust) the gain of the RF attenuator based on the current temperature and the user's reference level setting. (The reference level setting represents the maximum average signal power expected at the analyzer's RF input, and indirectly controls the amount of RF attenuation applied.) In these embodiments, the calibration routine may direct the driver to update the RF attenuator gain of each channel based on its current temperature and its reference level setting and then freeze the state of the RF attenuator (i.e., disable further changes to the RF attenuator gain). Thus, the driver will not change the attenuator gain during calibration or during subsequent system use (when the calibration is being applied and measurements are being acquired). Changing the RF attenuator state of a channel would change the amplitude and phase response, as well as the electrical propagation delay of that channel and would render the calibration invalid.

II. Coarse Alignment of Slave Sample Clocks to Master Sample Clock

This step comprises executing an automatic synchronization process, e.g., the synchronization process provided by NI-TClk technology. This synchronization process provides a coarse alignment of the ADC sample clock of each slave channel with the ADC sample clock of the master channel. The residual skew between each slave channel and the master channel will be minimized or compensated in the following steps. One or more of those steps may involve intentionally skewing the slave sample clocks to compensate for delays elsewhere in the system. After the calibration routine is complete, the delay through the master and slave channels is matched, but the ADC sample sequences generated by the various channels may be skewed.

III. Measure the Relative Frequency Response Between Each Slave and the Master

The calibration routine may control the signal generator so that the frequency of the sinusoidal tone produced by the signal generator is swept across a frequency band, e.g., a band centered at the user's requested RF center frequency. (The sinusoidal tone is split to each VSA channel, e.g., as shown in FIGS. 1, 4, 5 and 5B.) In one embodiment, the signal generator output is swept over the band by stepping through a sequence of frequency points $\{f_j\}$, e.g., evenly-spaced frequency points. At each frequency point each channel $R_i$ downconverts the received signal $x_i(t)$ to an analog IF signal, digitizes the analog IF signal to obtain real IF samples, and then digitally downconverts the real IF samples to DC to obtain IQ samples (i.e., samples of the complex baseband sequence $y_i(k)$ in the parlance of FIG. 4). The channel $R_i$ captures a block $B_{i,j}$ of the IQ samples. (The term "IQ sample" is a synonym for "complex sample". Thus, the IQ sample has an inphase component and a quadrature component, which correspond respectively to the real and imaginary parts of the complex sample.)

For each channel $R_i$ and each frequency point $f_j$, the block $B_{i,j}$ of IQ samples is averaged to produce an average complex value $Z_{i,j}$. The average complex value $Z_{i,j}$ may be equivalently expressed in terms of an amplitude value $M_{i,j}$ and a phase value $\theta_{i,j}$:

$$Z_{i,j}=M_{i,j}\exp(j\theta_{i,j}).$$

For each slave channel $R_i$, a relative frequency response $H_i=A_i\exp(\phi_i)$ is computed. In other words, the relative frequency response may be computed by computing a relative frequency response value $H_{i,j}=A_{i,j}\exp(\phi_{i,j})$ at each frequency $f_j$. The relative frequency response value $H_{i,j}$ may be computed by dividing the average complex value $Z_{i,j}$ by the corresponding average complex value $Z_{1,j}$ of the master channel $R_1$:

$$H_{i,j}=Z_{i,j}/Z_{1,j}$$

As an alternative to the above direct computation of $H_i$, the relative amplitude response $A_i$ and the relative phase response $\phi_i$ may be computed as follows. For each frequency $f_j$, the relative amplitude response value $A_{i,j}$ may be computed by dividing the amplitude value $M_{i,j}$ of the slave channel $R_i$ by the corresponding amplitude value $M_{1,j}$ of the master channel $R_1$. Furthermore, for each frequency $f_j$, the relative phase response value $\phi_{i,j}$ may be computed by subtracting the phase value $\theta_{1,j}$ of the master channel $R_1$ from the corresponding phase value $\theta_{i,j}$ of the slave channel $R_i$.

IV. Calculate Custom Digital Equalization Filters for Each Slave Channel

The digitizer module of each channel may include a digital filter unit, e.g., the equalization filter unit 1315 as shown in FIG. 7. (The VSA products of National Instruments currently include this feature.) The digital filter unit operates on the digitized IF signal $y(k)$ to obtain a filtered IF signal $y_F(k)$. The impulse response (filter parameters) used by the digital filter unit is programmable. The present step (IV) may overwrite the factory-calibrated impulse response used by the digital filter unit of each slave channel with a new impulse response for the slave channel. The new impulse response may be computed as follows.

For each slave channel a linear fit (e.g., a least squares linear fit) is calculated for the relative phase response $\phi_i(f)$ of the slave channel relative to the master channel. The result of the linear fit is represented by a slope value $m_i$. Then the linear approximation specified by the linear fit is subtracted from the relative phase response $\phi_i(f)$ to obtain a residual phase response $\Delta\phi_i(f)$:

$$\Delta\phi_i(f)=\phi_i(f)-m_i f,$$

where f represents frequency (e.g., the frequency that is being swept across the IF output band of the instrument). The frequency f may be expressed as an absolute frequency, or alternatively, as a displacement relative to the IF center frequency. This residual phase response along with the relative amplitude response $A_i(f)$ of the slave channel $R_i$ are used to calculate a digital filter (impulse response) for the slave channel. The digital filter is designed so that its frequency response closely approximates the frequency response $\{1/A_i(f)\}\exp(-\Delta\phi_i(f))$. In other words, the digital filter is designed so that its amplitude response is the reciprocal of the amplitude response $A_i(f)$ and so that its phase response is the negative of the residual phase response $\Delta\phi_i(f)$. The digital filter is then applied to the slave channel, i.e., the digital filter unit of the slave channel is updated with the computed impulse response. After applying the digital filter, the relative frequency response $H_i$ of the slave channel $R_i$ will be approximately equal to the linear approximation $H_i(f)=\exp(jm_i f)$.

The number of taps in the filter's impulse response may vary widely from one embodiment to the next. For example, in different embodiments, the number of taps in the digital filter may be, respectively, in the range [4,32], in the range [32,128], in the range [128,1024], in the range [1024,4096], in the $[2^{12}, 2^{14}]$, etc.

For before and after illustrations of step IV's effect on the relative amplitude response, see FIG. 2 (before) and FIG. 4 (after) above. In some embodiments, this step (IV) is the only step in the calibration routine that addresses relative amplitude performance.

Figure 15:
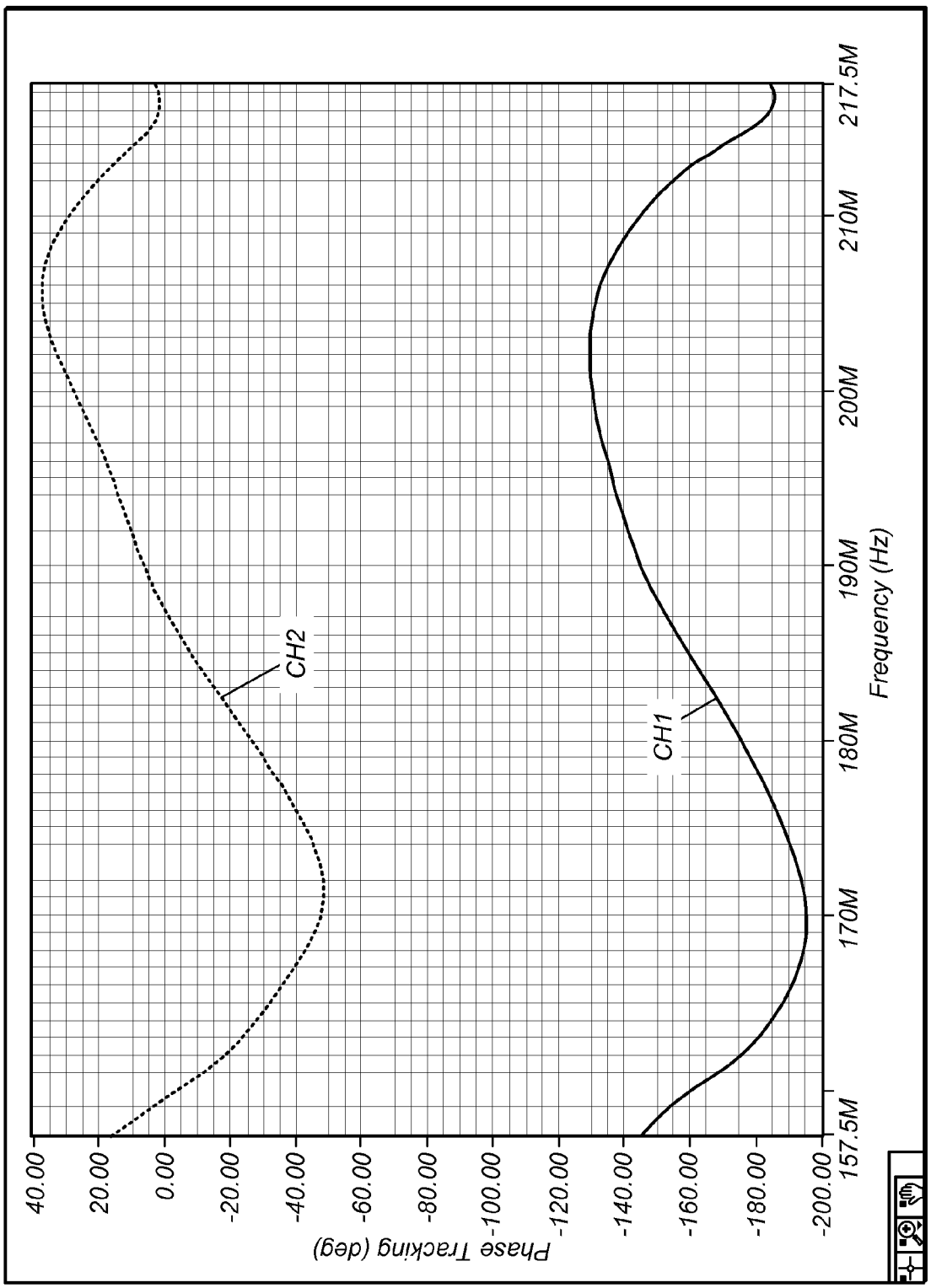
FIGS. 15 and 16 show the relative phase responses of the two slave channels before and after an operation of correcting for non-uniformities in relative amplitude responses and for deviation of relative phase responses from corresponding linear approximations.
Figure 16:
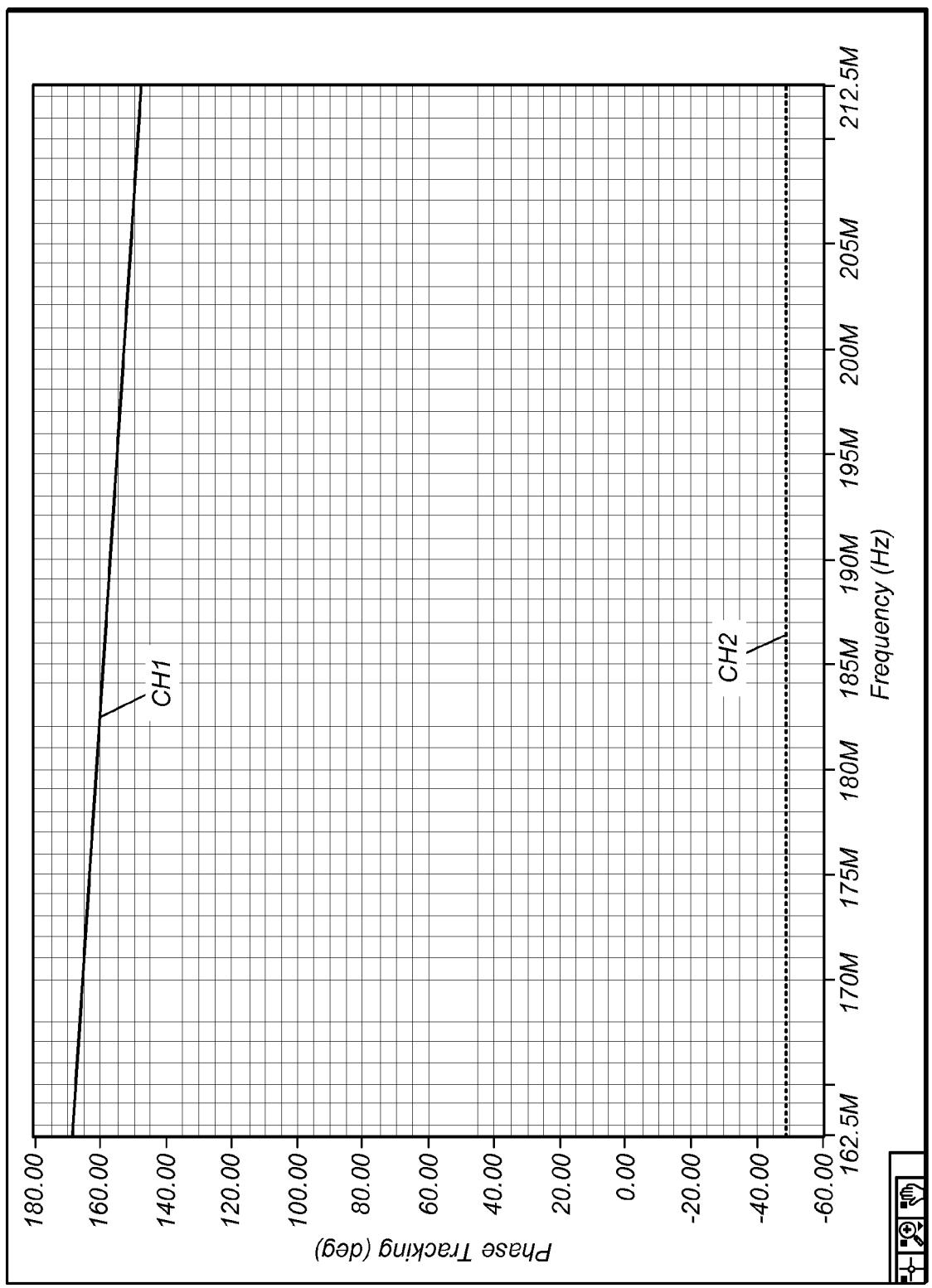

FIGS. 15 and 16 are a before and after look at step IV's effect on the relative phase responses. FIG. 15 shows the relative phase responses of the two respective slave channels with respect to the master channel before step IV. FIG. 16 shows the relative phase responses of the two respective slave channels with respect to the master channel after step IV (i.e., after the computed digital filters have been applied).

The slope $m_i$ of the relative phase response of a slave channel indicates residual time skew between that slave channel and the master, i.e., time skew remaining after the TClk synchronization. (The residual time skew may come from the analog filters internal to the vector signal analyzer.)

The slope of the relative phase response can be quantified in units of time (seconds). The remainder of the calibration routine deals with removing this residual skew, e.g., by adjusting the slave ADC sample clock phase.

Steps V-VIII of the calibration routine (described in detail below) may be used to remove residual skew between each slave channel and the master channel.

V. Measure the Relative Phase Response Between Each Slave and the Master

With the completion of step IV, the relative amplitude response between each slave and the master (i.e. amplitude tracking) is approximately equal to unity, and the relative phase response between each channel and the master (i.e. phase tracking) is now approximately linear. Although the relative phase response is now linear, it is not zero phase. This linear relative phase response of each slave channel can be removed in a number of different ways as described in step VI below.

Step V replicates the frequency sweep of step III with the above-described custom digital filters being applied in the respective slave channels. During the sweep, baseband sample data is acquired for each of the channels (master channel and slave channels). Then, an updated relative phase response $\phi_i(f)$ is computed for each slave channel $R_i$. FIG. 16 shows the updated relative phase response $\phi_i(f)$ for the two slave channels we have been using as an example. In one embodiment, the present sweep may be over a narrower band than the sweep of step III. (The sweep of step III may be larger than the desired final bandwidth of the calibration in order to provide the digital filter design toolkit extra information that makes designing the digital filters easier.)

VI. Calculate a Coarse Time Delay Per Slave Channel and Compensate

For each slave channel $R_i$, the slope $\mu_i$ of the updated relative phase response $\phi_i(f)$ as a function of frequency is calculated using a linear fit program. The slope $\mu_i$ represents the time delay between the slave channel $R_i$ and the master channel. The calculated slope $\mu_i$ may be used to apply a coarse adjustment to the slave channel $R_i$ to remove the time delay. The coarse adjustment may be implemented, e.g., by adjusting the ADC sample clock phase of the slave channel, or by introducing a compensating time delay using the fractional resampler 1335 of the slave channel, or by introducing a compensating time delay in the above-described equalization unit, or by any combination of the foregoing.

The NI-TClk software API provides a feature for adjusting the phase of the ADC sample clock. Specifically, the NI-TClk attribute SampleClkDelay may be used to adjust the sample clock phase of any given channel by a specified amount. Description of this attribute may be found in the NI-TClk Synchronization Help file.

The NI-TClk Sample Clock Delay Property (Short Name: SampleClkDelay) specifies the delay, in seconds, to apply to the session sample clock relative to the other synchronized sessions. During synchronization, NI-TClk aligns the sample clocks on the synchronized devices. If one desires to delay the sample clocks, set this property before calling the niTClk Synchronize VI. The values for the Sample Clock Delay Property range between minus one and plus one period of the sample clock. One sample clock period is equal to (1/sample clock rate). For example, for a session with sample rate of 100 MS/s, you can specify sample clock delays between −10.0 ns and +10.0 ns. The default value is 0.

FIG. 16 illustrates the relative phase responses for the two slave channels before step VI.

Figure 17:
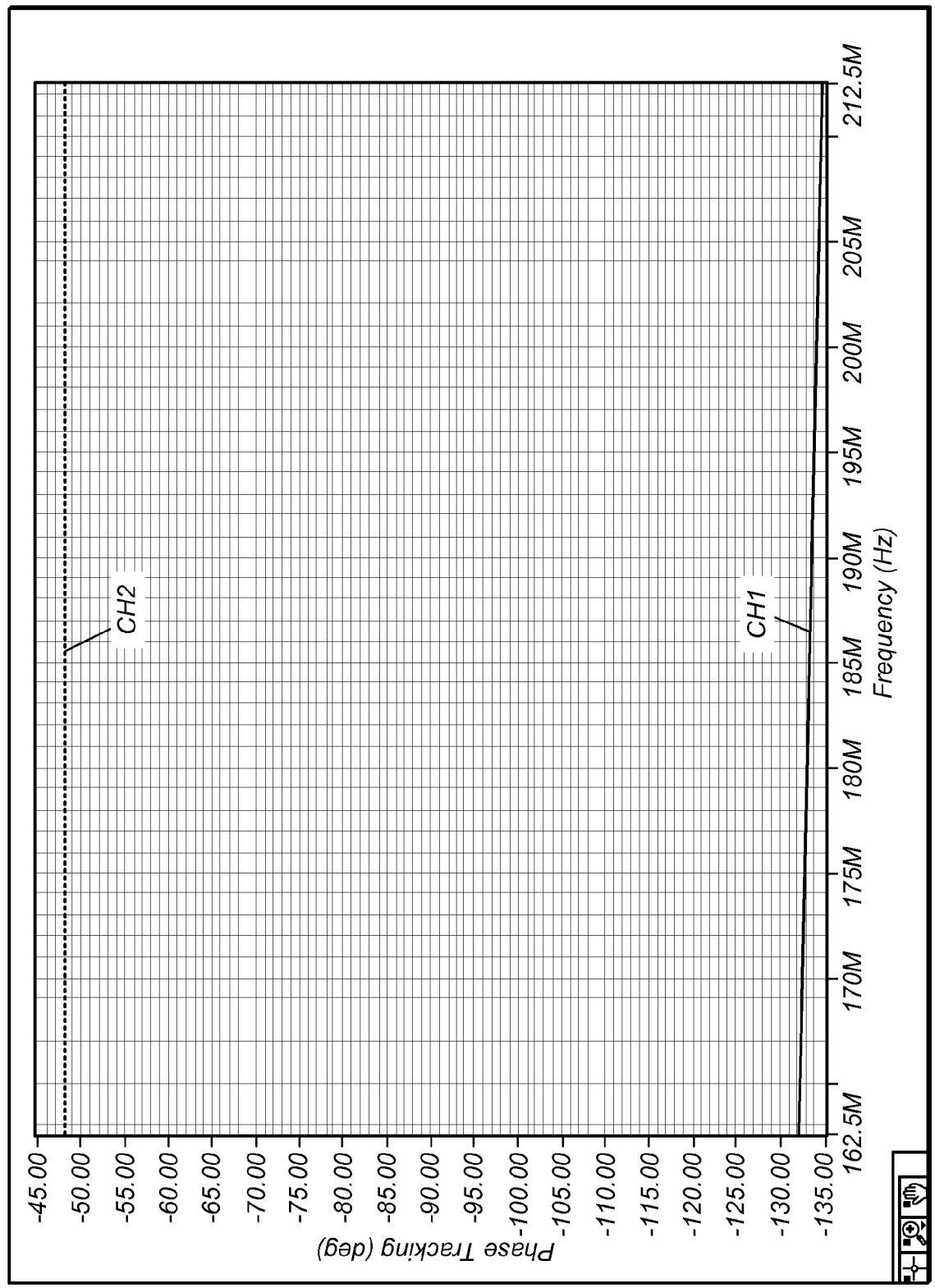
FIG. 17 illustrates the relative phase responses of the two slave channels after performing a coarse correction for time skews of the slave channels with respect to the master channel.

FIG. 17 illustrates the relative phase responses of the two slave channels after step VI. Notice that the relative phase response for slave channel CH1 is significantly flatter (closer to zero slope) than before step VI. (The relative phase response for slave channel CH2 was already relatively flat before step VI, and thus, doesn't show a perceptible increase in flatness after step VI, at least at the vertical scale shown in FIG. 17.)

As described below, a fine skew adjustment may be used to remove any remaining time delay between the slave channels and the master channel.

VII. Measure the Relative Phase Responses of the Slave Channels

After the coarse adjustment applied in step VI, the sweep of the signal generator tone is repeated, new baseband sample data is acquired from each channel (master channel and slave channels), and an updated relative phase response $\phi_i(f)$ is computed for each slave channel $R_i$. See, e.g., FIG. 17.

VIII. Calculate Residual Time Delay and Compensate

For each slave channel $R_i$, the slope $r_i$ of the updated relative phase response $\phi_i(f)$ of the slave channel relative to the master channel is computed. The slope $r_i$ represents a residual time delay between the slave channel $R_i$ and the master channel $R_1$. The term "residual" here implies that the time delay is what remains after the compensation step VI. The slope $r_i$ may be calculated using a linear fit routine (e.g., a least squares routine). The slope $r_i$ is then used to make a fine adjustment to the slave channel in order to remove the residual time delay. In one embodiment, the fine adjustment may be implemented by adjusting the sample clock phase of the slave channel. For example, the NI-Scope software provided by National Instruments includes an API for making such adjustments. In particular, a LabVIEW program may call the NI-Scope subVI Adjust_Sample_Clock_Relative_Delay.vi to make an adjustment to the sample clock phase. (This subVI is described in the NI High-Speed Digitizers Help file.

The NI-Scope "Adjust Sample Clock Relative Delay" subVI configures the relative sample clock delay (in seconds) when using the internal clock. Each time this VI is called, the Sample Clock is delayed from the reference clock by the specified amount of time.

FIG. 17 illustrates the relative phase responses of the two slave channels of the example before this step (VIII) is performed.

Figure 18:
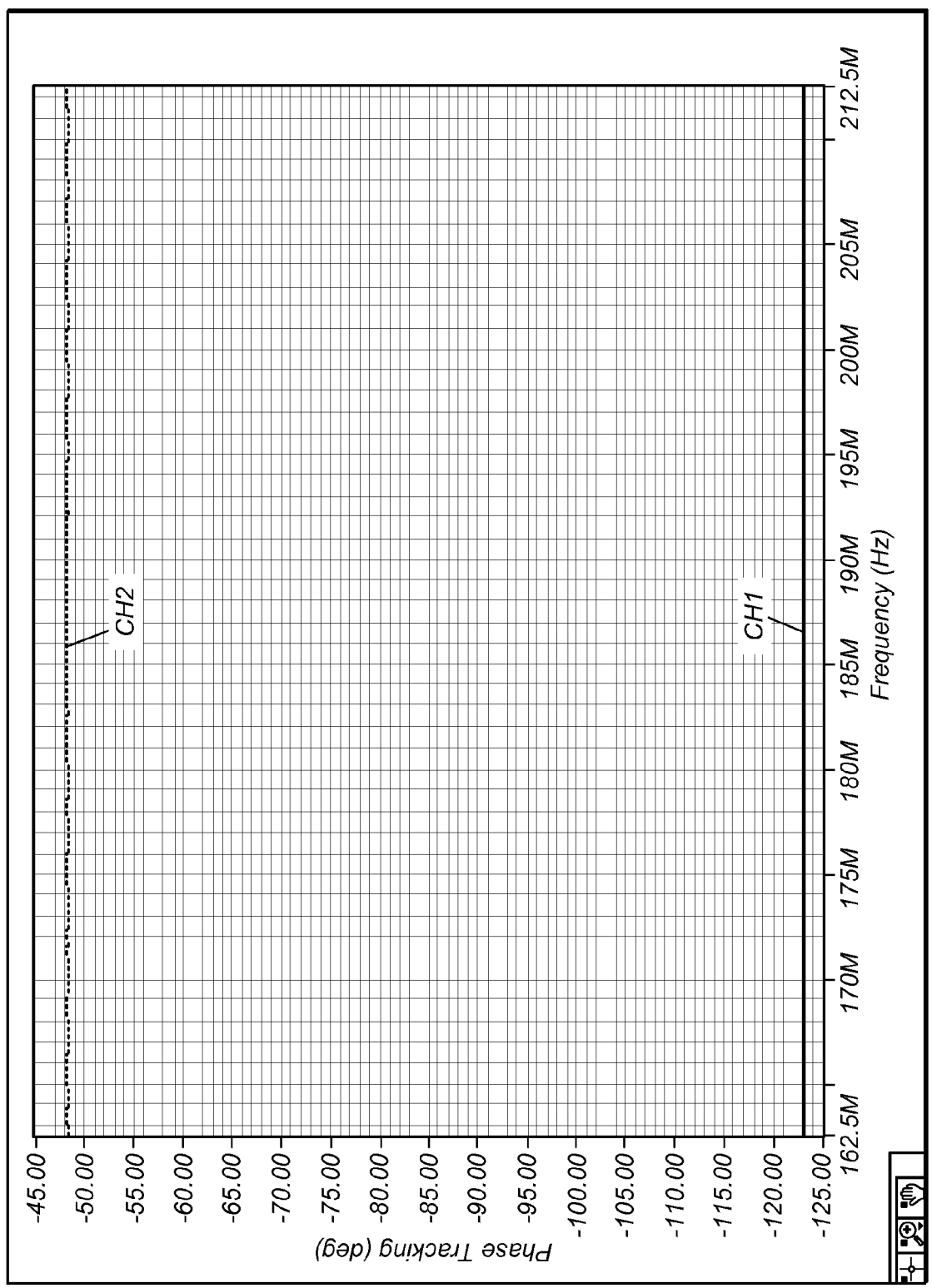
FIG. 18 illustrates the relative phase responses of the two slave channels after performing a fine correction for residual time skews of the slave channels with respect to the master channel.

FIG. 18 illustrates the relative phase responses after this step is completed, i.e., after the fine adjustments have been made to the slave channels. Notice that the relative phase responses now appear flat (i.e., zero slope), which is indicative of zero skew. However, the goal for the relative phase responses is not merely flatness but constant phase equal to zero. Thus, the remaining steps address the removal of the mean phase offset of each slave channel.

IX. Measure the Relative Phase Response for Each Slave Channel

After the fine skew adjustment of step VIII, the sweep of the signal generator tone is repeated, new baseband sample data is acquired from each channel (master channel and slave channels), and an updated relative phase response $\phi_i(f)$ is computed for each slave channel $R_i$. See, e.g., FIG. 18.

X. Calculate the Mean Phase Offset for each Slave Channel and Compensate

For each slave channel $R_i$, the average value $AVG_i$ of the relative phase response $\phi_i(f)$ over the frequency band is calculated for each slave channel. The average value $AVG_i$ is used to adjust the slave channel in order to remove the average value. In one embodiment, the phase of the numerically-controlled oscillator (NCO) 1333 in the digital processing module of the slave channel is adjusted. For example, the NI-RFSA driver provided by National Instruments includes an attribute Phase_Offset that may be used to adjust the NCO phase.

FIG. 11 illustrates the relative phase responses of the two slave channels relative to the master channel after step X.

Although commercially available power splitters can achieve very nearly equal splitting of the RF input signal among the plurality of outputs, the splitting will never be exactly perfect. ("Equal splitting" may be defined in terms of the amplitude and phase of the outputs. An ideal splitter will have the exact same amplitude and phase at each output across all frequencies, i.e., 0 dB amplitude tracking and 0 degree phase tracking) Nor will the cables (from the splitter to the respective VSAs) have identical magnitude and phase responses and lengths. Assuming ideal behavior from the power splitter and the cables creates inherent (albeit small) residual error in the performance of the calibration routine. The residual error is dependent on the selection of the particular cables and particular splitter used during implementation. In one embodiment, the calibration routine may remove this small source of residual error.

A vector network analyzer (VNA) may be used to measure the insertion loss and insertion phase of the signal path from the input of the power splitter to the far end (the VSA end) of each cable attached to the splitter output. The measured insertion loss values and insertion phase values may be used to correct the acquired amplitude and phase response data during calibration.

It is also possible to compensate for splitter and cable non-uniformities without the use of a vector network analyzer (VNA). It is easiest to think in terms of a two-channel system, but the technique may be expanded to systems with more than two channels. The technique is to perform the calibration as described and then swap the RF connections at the calibration plane and then repeat the calibration. (The calibration plane is the conceptual plane that separates between the output of the power splitter and the inputs of the receivers.) The magnitude and phase skew from the splitter and cables will have the opposite sign in the second calibration. If the two results are averaged, the splitter and cable tracking will drop out and one is left with just the receiver's relative frequency response. (The magnitude and the phase are averaged separately.)

Figure 19:
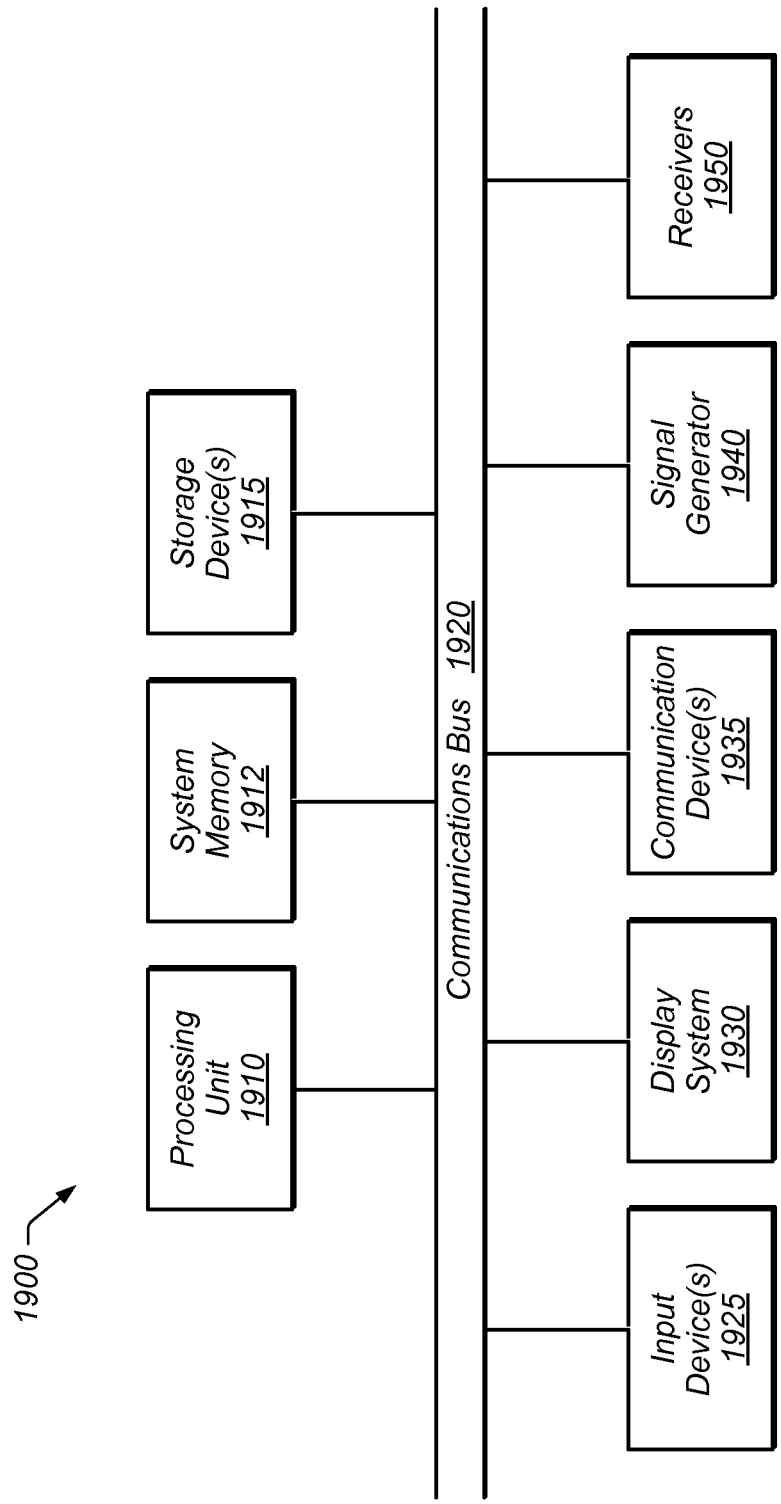
FIG. 19 illustrate one embodiment of a computer system that may be used to implement any of the various method embodiments described herein.

FIG. 19 illustrates one embodiment of a computer system 1900 that may be used to perform any of the method embodiments described herein, or, any combination of the method embodiments described herein, or any subset of any of the method embodiments described herein, or, any combination of such subsets.

Computer system 1900 may include a processing unit 1910, a system memory 1912, a set 1915 of one or more storage devices, a communication bus 1920, a set 1925 of input devices, and a display system 1930.

System memory 1912 may include a set of semiconductor devices such as RAM devices (and perhaps also a set of ROM devices).

Storage devices 1915 may include any of various storage devices such as one or more memory media and/or memory access devices. For example, storage devices 1915 may include devices such as a CD/DVD-ROM drive, a hard disk, a magnetic disk drive, magnetic tape drives, etc.

Processing unit 1910 is configured to read and execute program instructions, e.g., program instructions stored in system memory 1912 and/or on one or more of the storage devices 1915. Processing unit 1910 may couple to system memory 1912 through communication bus 1920 (or through a system of interconnected busses, or through a network). The program instructions configure the computer system 1900 to implement a method, e.g., any of the method embodiments described herein, or, any combination of the method embodiments described herein, or, any subset of any of the method embodiments described herein, or any combination of such subsets.

Processing unit 1910 may include one or more processors (e.g., microprocessors).

One or more users may supply input to the computer system 1900 through the input devices 1925. Input devices 1925 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), or any combination thereof.

The display system 1930 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 1900 may include other devices, e.g., devices such as one or more graphics accelerators, one or more speakers, a sound card, a video camera and a video card, a data acquisition system.

In some embodiments, computer system 1900 may include one or more communication devices 1935, e.g., a network interface card for interfacing with a computer network. As another example, the communication device 1935 may include a specialized interface for communication via any of a variety of established communication standards or protocols (e.g., USB, Firewire, PCI, PCI Express, PXI).

The computer system may be configured with a software infrastructure including an operating system, and perhaps also, one or more graphics APIs (such as OpenGL®, Direct3D, Java 3D™). In some embodiments, the software infrastructure may include National Instruments LabVIEW™ software, and/or, LabVIEW™ FPGA.

In some embodiments, the computer system 1900 may be configured to interface with signal generator 1940. The signal generator may be configured to generate and transmit signals (onto a communication channel) as variously described herein. The signal generator may operate under the control of software executing on processor 1910 and/or software executing on the transmitter itself.

In some embodiments, the computer system 1900 may be configured to interface with a set of receivers 1950. The receivers may be configured to receive signals (from a communication channel) as variously described herein. The receiver may operate under the control of software executing on processor 1910 and/or software executing on the receiver itself.

In some embodiments, the signal generator and/or the receiver may include one or more programmable hardware elements and/or one or more microprocessors for performing digital processing on digital data (e.g., on digital baseband signals or digital IF signals) as variously described herein.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for synchronizing a plurality of receiver channels, the method comprising:
    calibrating the plurality of receiver channels, wherein said calibrating synchronizes the plurality of receiver channels, wherein one of the receiver channels is designated as a master channel, wherein the one or more remaining receiver channels are designated as slave channels, wherein each of the receiver channels includes a signal path that is configured to: down-convert a respective input signal to obtain a respective IF (intermediate frequency) signal, digitize the respective IF signal based on a respective sample clock to obtain a respective IF sample sequence, digitally down-convert the respective IF sample sequence to obtain a respective baseband sample sequence;
    wherein said calibrating the plurality of receiver channels includes, for each of the slave channels:
        computing a relative frequency response between the slave channel and the master channel, wherein the relative frequency response is based on the respective baseband sample sequence of the slave channel and the respective baseband sample sequence of the master channel;
        computing a digital filter for the slave channel based on the relative frequency response, wherein the digital filter is configured to compensate for non-uniformity in amplitude of the relative frequency response and for a deviation of phase of the relative frequency response from a linear approximation of the phase of the relative frequency response;
        programming a digital circuit of the slave channel to implement the digital filter, wherein, after said programming, the digital circuit of the slave channel applies the digital filter to the respective IF sample sequence prior to said digital down-converting of the respective IF sample sequence.

2. The method of claim 1, wherein said calibrating also includes:
    executing a first computer program that causes the sample clocks of the respective receiver channels to be more closely aligned in time than prior to said executing first computer program, wherein said computing a relative frequency response for each of the slave channels is performed after having executed the first computer program.

3. The method of claim 1, wherein said calibrating also includes, for each of the slave channels:
    computing an updated relative phase response between the slave channel and the master channel after having performed said programming;
    computing a slope of the updated relative phase response;
    directing the slave channel to apply a time delay to its signal path, wherein the value of the time delay is based on the computed slope.

4. The method of claim 3, wherein said directing the slave channel to apply the time delay includes adjusting a phase of the sample clock of the slave channel based on the computed slope.

5. The method of claim 3, wherein said calibrating also includes, for each of the slave channels, modifying the digital filter of the slave channel to include the corresponding time delay, wherein said directing the slave channel to apply the time delay includes programming the digital circuit of the slave channel to implement the modified digital filter.

6. The method of claim 3, wherein said calibrating also includes, for each of the slave channels, generating coefficients for a fractional resampler, wherein said directing the slave channel to apply the time delay includes programming the digital circuit to implement the fractional resampler in addition to the digital filter.

7. The method of claim 3, wherein said calibrating also includes, for each of the slave channels:
    computing a second updated relative phase response between the slave channel and the master channel after having performed said directing the slave channel to apply the time delay to its signal path;
    computing a residual slope of the second updated relative phase response;
    adjusting a phase of the sample clock of the slave channel based on the computed residual slope.

8. The method of claim 7, wherein each of the receiver channels includes a corresponding numerically controlled oscillator (NCO) configured to generate an orthogonal pair of digital sinusoids having programmable phase and programmable frequency, wherein said calibrating also includes, for each of the slave channels:

computing a third updated relative phase response between the slave channel and the master channel after said adjusting the phase of the sample clock of the slave channel;

computing an average phase value of the corresponding third updated relative phase response;

adjusting the phase of the corresponding numerically controlled oscillator in order to remove the corresponding average phase value.

9. The method of claim 1, wherein the designation of which receiver channel is to be the master channel is software controlled.

10. The method of claim 1, wherein each of the receiver channels is also configured to digitally generate a respective trigger clock from the respective sample clock signal, wherein the respective trigger clock is used to condition a reception of a trigger signal, wherein the trigger signal is used to determine a start of acquisition of the respective baseband sample sequence into a respective memory.

11. A non-transitory computer-readable memory medium for synchronizing a plurality of receiver channels, wherein the memory medium stores program instructions, wherein the program instructions, when executed by a computer system, cause the computer system to:

calibrate the plurality of receiver channels, wherein said calibrating synchronizes the plurality of receiver channels, wherein one of the receiver channels is designated as a master channel, wherein the one or more remaining receiver channels are designated as slave channels, wherein each of the receiver channels includes a signal path that is configured to: down-convert a respective input signal to obtain a respective IF (intermediate frequency) signal, digitize the respective IF signal based on a respective sample clock to obtain a respective IF sample sequence, digitally down-convert the respective IF sample sequence to obtain a respective baseband sample sequence;

wherein said calibrating the plurality of receiver channels includes, for each of the slave channels:

computing a relative frequency response between the slave channel and the master channel, wherein the relative frequency response is based on the respective baseband sample sequence of the slave channel and the respective baseband sample sequence of the master channel;

computing a digital filter for the slave channel based on the relative frequency response, wherein the digital filter is configured to compensate for non-uniformity in amplitude of the relative frequency response and for a deviation of phase of the relative frequency response from a linear approximation of the phase of the relative frequency response;

programming a digital circuit of the slave channel to implement the digital filter, wherein, after said programming, the digital circuit of the slave channel applies the digital filter to the respective IF sample sequence prior to said digital down-converting of the respective IF sample sequence.

12. The memory medium of claim 11, wherein said calibrating also includes:

executing a first computer program that causes the sample clocks of the respective receiver channels to be more closely aligned in time than prior to said executing first computer program, wherein said computing a relative frequency response for each of the slave channels is performed after having executed the first computer program.

13. The memory medium of claim 11, wherein said calibrating also includes, for each of the slave channels:

computing an updated relative phase response between the slave channel and the master channel after having performed said programming;

computing a slope of the updated relative phase response;

directing the slave channel to apply a time delay to its signal path, wherein the value of the time delay is based on the computed slope.

14. The memory medium of claim 13, wherein said directing the slave channel to apply the time delay includes adjusting a phase of the sample clock of the slave channel based on the computed slope.

15. The memory medium of claim 13, wherein said calibrating also includes, for each of the slave channels, modifying the digital filter of the slave channel to include the corresponding time delay, wherein said directing the slave channel to apply the time delay includes programming the digital circuit of the slave channel to implement the modified digital filter.

16. The memory medium of claim 13, wherein said calibrating also includes, for each of the slave channels, generating coefficients for a fractional resampler, wherein said directing the slave channel to apply the time delay includes programming the digital circuit to implement the fractional resampler in addition to the digital filter.

17. The memory medium of claim 13, wherein said calibrating also includes, for each of the slave channels:

computing a second updated relative phase response between the slave channel and the master channel after having performed said directing the slave channel to apply the time delay to its signal path;

computing a residual slope of the second updated relative phase response;

adjusting a phase of the sample clock of the slave channel based on the computed residual slope.

18. The memory medium of claim 17, wherein each of the receiver channels includes a corresponding numerically controlled oscillator (NCO) configured to generate an orthogonal pair of digital sinusoids having programmable phase and programmable frequency, wherein said calibrating also includes, for each of the slave channels:

computing a third updated relative phase response between the slave channel and the master channel after said adjusting the phase of the sample clock of the slave channel;

computing an average phase value of the corresponding third updated relative phase response;

adjusting the phase of the corresponding numerically controlled oscillator in order to remove the corresponding average phase value.

19. The memory medium of claim 11, wherein the designation of which receiver channel is to be the master channel is software controlled.

20. The memory medium of claim 11, wherein each of the receiver channels is also configured to digitally generate a respective trigger clock from the respective sample clock signal, wherein the respective trigger clock is used to condition a reception of a trigger signal, wherein the trigger signal is used to determine a start of acquisition of the respective baseband sample sequence into a respective memory.

21. A computer system for synchronizing a plurality of receiver channels, the computer system comprising:

a processor; and memory storing program instructions, wherein the program instructions, when executed by the processor, cause the processor to:

calibrate the plurality of receiver channels, wherein said calibrating synchronizes the plurality of receiver channels, wherein one of the receiver channels is designated as a master channel, wherein the one or more remaining receiver channels are designated as slave channels, wherein each of the receiver channels includes a signal path that is configured to: down-convert a respective input signal to obtain a respective IF (intermediate frequency) signal, digitize the respective IF signal based on a respective sample clock to obtain a respective IF sample sequence, digitally down-convert the respective IF sample sequence to obtain a respective baseband sample sequence, wherein said calibrating the plurality of receiver channels includes, for each of the slave channels:

computing a relative frequency response between the slave channel and the master channel, wherein the relative frequency response is based on the respective baseband sample sequence of the slave channel and the respective baseband sample sequence of the master channel;

computing a digital filter for the slave channel based on the relative frequency response, wherein the digital filter is configured to compensate for non-uniformity in amplitude of the relative frequency response and for a deviation of phase of the relative frequency response from a linear approximation of the phase of the relative frequency response; and programming a digital circuit of the slave channel to implement the digital filter, wherein, after said programming, the digital circuit of the slave channel applies the digital filter to the respective IF sample sequence prior to said digital down-converting of the respective IF sample sequence.

22. A computer-implemented method for synchronizing a second receiver with respect to a first receiver, the method comprising:

calibrating the second receiver, wherein said calibrating synchronizes the second receiver to the first receiver, wherein each receiver includes a signal path that is configured to: receive a respective input signal, down-convert the respective input signal to obtain a respective IF signal, digitize the respective IF signal based on a respective sample clock to obtain a respective IF sample sequence, digitally down-convert the respective IF sample sequence to obtain a respective baseband sample sequence, wherein said calibrating the second receiver includes:

computing a relative frequency response of the second receiver with respect to the first receiver based on the respective baseband sample sequence of the second receiver and the respective baseband sample sequence of the first receiver;

computing a digital filter for the second receiver based on the relative frequency response, wherein the digital filter is configured to compensate for non-uniformity in amplitude of the relative frequency response and for a deviation of phase of the relative frequency response from a linear approximation of the phase of the relative frequency response;

programming a digital circuit of the second receiver to implement the digital filter, wherein, after said programming, the digital circuit applies the digital filter to the IF sample sequence of the second receiver prior to said digital down-converting of that IF sample sequence.

23. The method of claim 22, wherein said calibrating the second receiver also includes:

executing a first computer program that causes the sample clock of the second receiver to be more closely aligned in time to the sample clock of the first receiver, wherein said computing a relative frequency response is performed after having executed the first computer program.

24. The method of claim 22, wherein said calibrating the second receiver also includes:

computing an updated relative phase response of the second receiver relative to the first receiver after having performed said programming;

computing a slope of the updated relative phase response;

directing the second receiver to apply a time delay to its signal path, wherein the value of the time delay is based on the computed slope.

25. The method of claim 24, wherein said calibrating the second receiver also includes:

computing a second updated relative phase response of the second receiver relative to the first receiver after having performed said directing the second receiver to apply the time delay to its signal path;

computing a residual slope of the second updated relative phase response;

adjusting a phase of the sample clock of the second receiver based on the residual slope.

26. The method of claim 25, wherein the second receiver includes a numerically controlled oscillator configured to generate an orthogonal pair of digital sinusoids having programmable phase and programmable frequency, wherein said calibrating the second receiver also includes:

computing a third updated relative phase response of the second receiver relative to the first receiver after having performed said adjusting the phase of the sample clock of the second receiver;

computing an average phase value of the third updated relative phase response;

adjusting the phase of the numerically controlled oscillator of the second receiver in order to remove the average phase value.

* * * * *